US012624759B2

(12) United States Patent  
Matsueda

(10) Patent No.: US 12,624,759 B2  
(45) Date of Patent: May 12, 2026

(54) THREADED FASTENER, AND FUNCTION ADDITION MEMBER OF THREADED FASTENER

(71) Applicant: TOPURA CO., LTD., Hadano (JP)

(72) Inventor: Youichi Matsueda, Hadano (JP)

(73) Assignee: TOPURA CO., LTD., Hadano (JP)

( * ) Notice: Subject to any disclaimer, the term of this patent is extended or adjusted under 35 U.S.C. 154(b) by 31 days.

(21) Appl. No.: 18/566,016

(22) PCT Filed: Sep. 16, 2021

(86) PCT No.: PCT/JP2021/034042  
§ 371 (c)(1),  
(2) Date: Nov. 30, 2023

(87) PCT Pub. No.: WO2022/254739  
PCT Pub. Date: Dec. 8, 2022

(65) Prior Publication Data  
US 2024/0247680 A1 Jul. 25, 2024

(30) Foreign Application Priority Data

Jun. 1, 2021 (JP) ................................. 2021-092464

(51) Int. Cl.  
*F16J 15/02* (2006.01)  
*F16B 43/00* (2006.01)  
*F16J 15/12* (2006.01)

(52) U.S. Cl.  
CPC ........... *F16J 15/028* (2013.01); *F16B 43/001* (2013.01); *F16J 15/128* (2013.01)

(58) Field of Classification Search  
CPC ........ F16J 15/022; F16J 15/024; F16J 15/025; F16J 15/028; F16J 15/064; F16J 15/12; F16J 15/128; F16B 43/001; F16B 33/004  
See application file for complete search history.

(56) References Cited

U.S. PATENT DOCUMENTS

| | | | | | |
|---|---|---|---|---|---|
| 2,761,347 | A | * | 9/1956 | Mckee, Jr. ............ | F16B 43/001 |
| | | | | | 411/371.1 |
| 2,981,651 | A | * | 4/1961 | Arnold .................... | F16J 15/02 |
| | | | | | 277/650 |

(Continued)

FOREIGN PATENT DOCUMENTS

| | | |
|---|---|---|
| DE | 3427778 A1 | 2/1985 |
| EP | 2944833 A1 | 11/2015 |

(Continued)

OTHER PUBLICATIONS

Extended European Search Report dated Aug. 28, 2024 (corresponding to EP 21944231.6).

*Primary Examiner* — Nicholas L Foster  
(74) *Attorney, Agent, or Firm* — Harness, Dickey & Pierce, P.L.C.

(57) ABSTRACT

To provide a screwing fastener that is capable of preventing damage to a function adding member when tightening, and is capable of maintaining suitable functions of the function adding member and a suitable fastened state. A screwing fastener includes a fastener main body 10, a screw portion 13 for tightening the fastener main body 10 to a fastened member 200, a flange portion 14 provided to the fastener main body 10, and a seal function adding member 20 (function adding member) that is provided to the flange portion 14, in which the seal function adding member 20 comes into contact with the fastened member when tightening. The seal function adding member 20 has at least a two-layer structure of a sliding portion 22 (first adding portion) that is in contact with the flange portion 14, and a seal portion 21 (second adding portion) that comes into contact with the fastened member 200.

6 Claims, 17 Drawing Sheets

(56)                     References Cited

U.S. PATENT DOCUMENTS

| | | | | |
|---|---|---|---|---|
| 3,184,769 A * | 5/1965 | Barwood | F16B 43/001 | 470/42 |
| 3,399,589 A | 9/1968 | Breed | | |
| 3,452,636 A * | 7/1969 | Cohen | F16B 43/001 | 403/376 |
| 3,661,046 A * | 5/1972 | Waud | F16B 25/0047 | 277/637 |
| 3,670,618 A * | 6/1972 | Jellison | F16B 43/001 | 277/637 |
| 3,803,972 A * | 4/1974 | Deutsher | F16B 37/14 | 411/375 |
| 4,214,444 A * | 7/1980 | Fujioka | F01N 13/1811 | 60/322 |
| 4,280,390 A * | 7/1981 | Murray | F16B 43/001 | 411/542 |
| 4,292,876 A * | 10/1981 | De Graan | F16B 43/001 | 411/542 |
| 4,373,842 A * | 2/1983 | Bettini | F16B 43/001 | 411/407 |
| 4,460,300 A * | 7/1984 | Bettini | F16B 33/004 | 411/375 |
| 5,011,162 A * | 4/1991 | Jelinek | F16B 43/001 | 411/542 |
| 5,156,509 A * | 10/1992 | Wu | F16B 43/001 | 411/371.1 |
| 5,281,065 A * | 1/1994 | Wu | F16B 43/001 | 411/258 |
| 5,306,108 A * | 4/1994 | Goldman | F16J 15/027 | 411/542 |
| 5,338,141 A * | 8/1994 | Hulsey | F16B 37/14 | 411/375 |
| 5,846,040 A * | 12/1998 | Ueno | F16B 19/008 | 411/45 |
| 5,906,463 A | 5/1999 | Damm et al. | | |
| 5,957,508 A | 9/1999 | Rief et al. | | |
| 8,029,223 B2 * | 10/2011 | Mair | F16B 43/001 | 411/371.2 |
| 8,511,034 B2 * | 8/2013 | Gregg | B60N 2/015 | 52/698 |
| 9,322,427 B2 * | 4/2016 | Thau | F16B 43/001 | |
| 9,441,664 B2 * | 9/2016 | Utsuno | F16B 43/001 | |
| 12,038,035 B2 * | 7/2024 | Matsueda | F16B 35/048 | |
| 2010/0003106 A1 | 1/2010 | Ishida et al. | | |
| 2010/0047033 A1 * | 2/2010 | Baumgartner | F16B 35/048 | 411/84 |
| 2010/0047037 A1 | 2/2010 | Ishida et al. | | |
| 2012/0027538 A1 | 2/2012 | Thau et al. | | |
| 2021/0301861 A1 * | 9/2021 | Matsueda | F16B 35/041 | |

FOREIGN PATENT DOCUMENTS

| | | | |
|---|---|---|---|
| JP | 5145226 | B2 | 2/2013 |
| JP | 5276447 | B2 | 8/2013 |
| WO | 2008010523 | A1 | 1/2008 |
| WO | 2008066031 | A1 | 6/2008 |

* cited by examiner

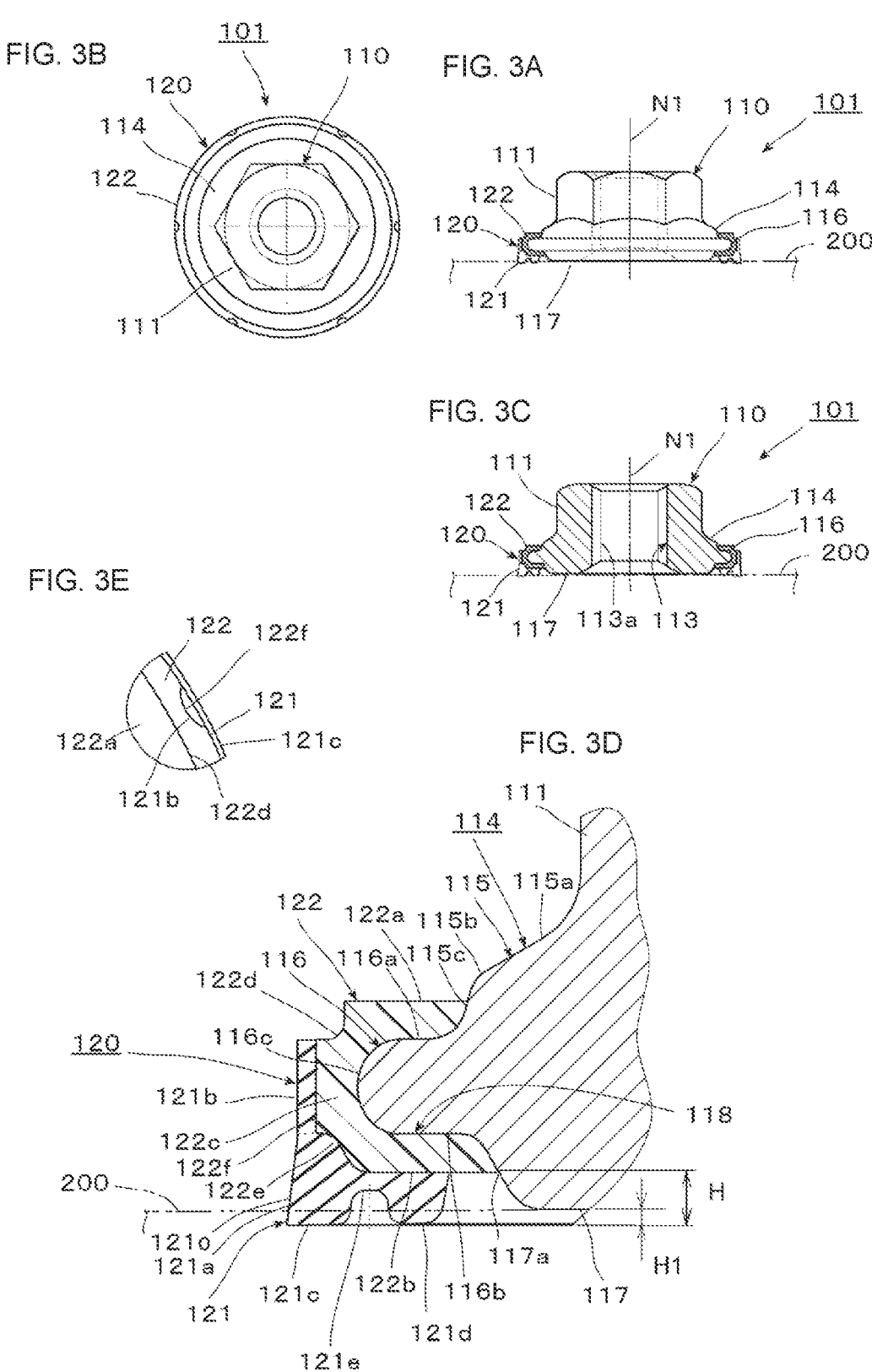

FIG. 9C
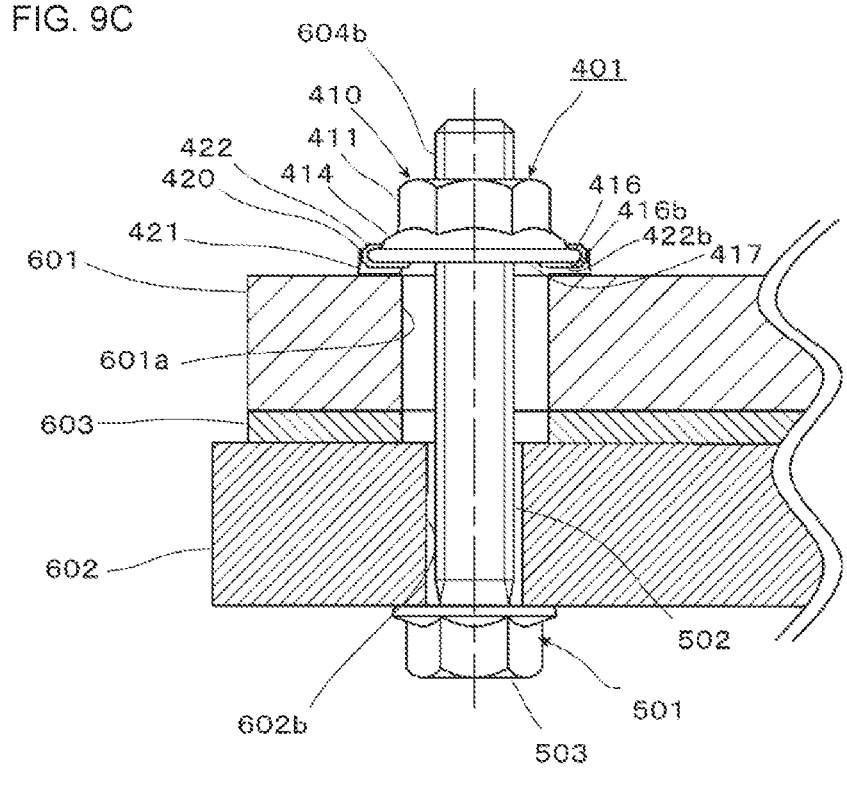
FIG. 9A
FIG. 9B
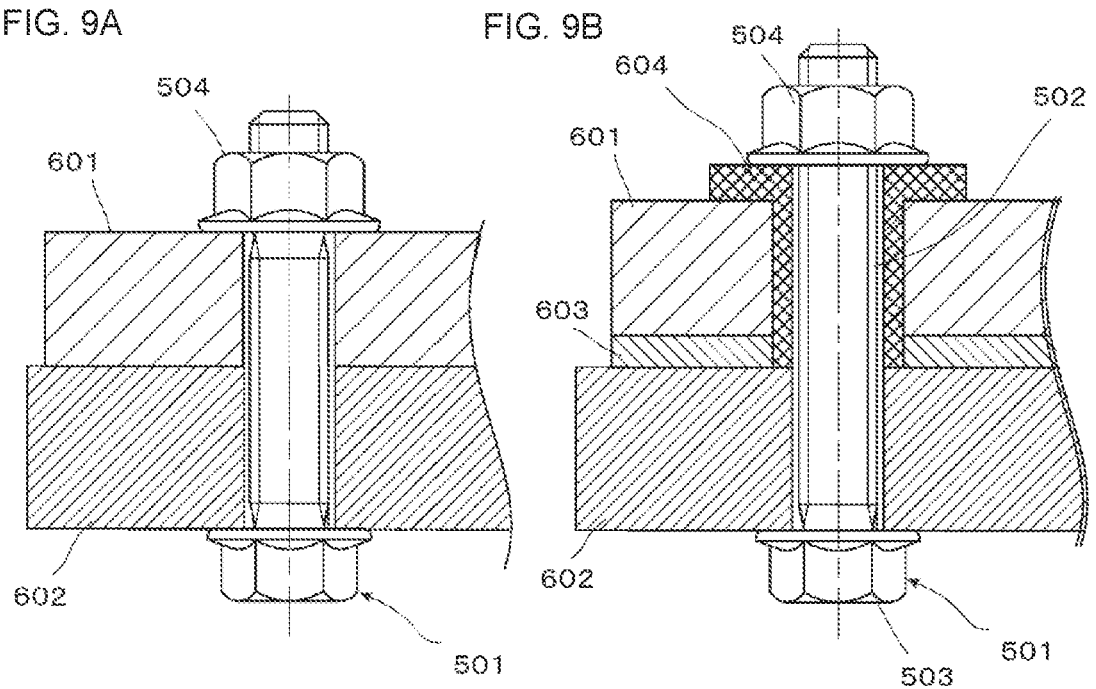

FIG. 10A
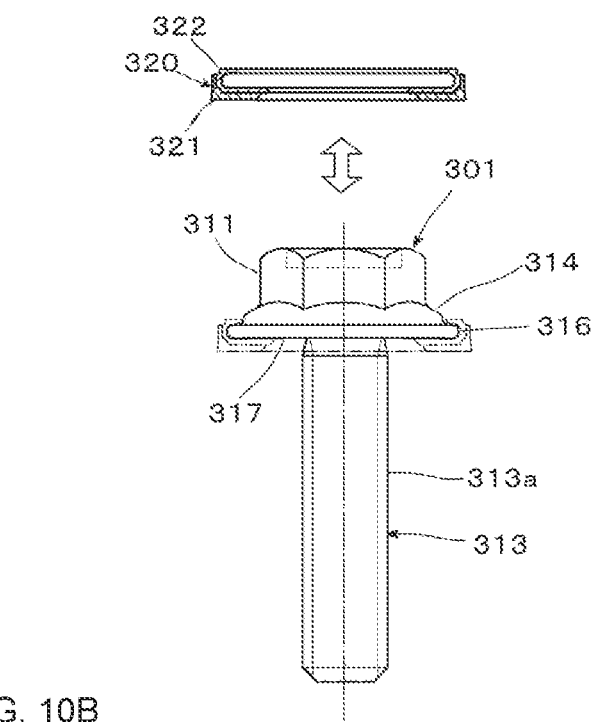
FIG. 10B
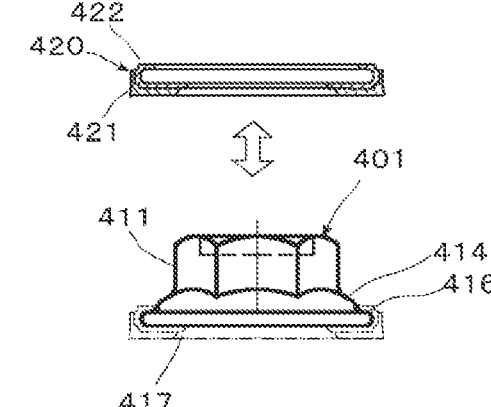
FIG. 10C
FIG. 10D
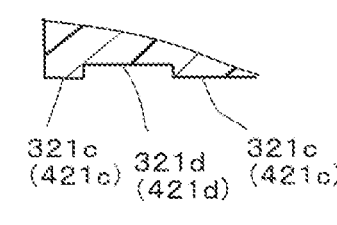

FIG. 12A
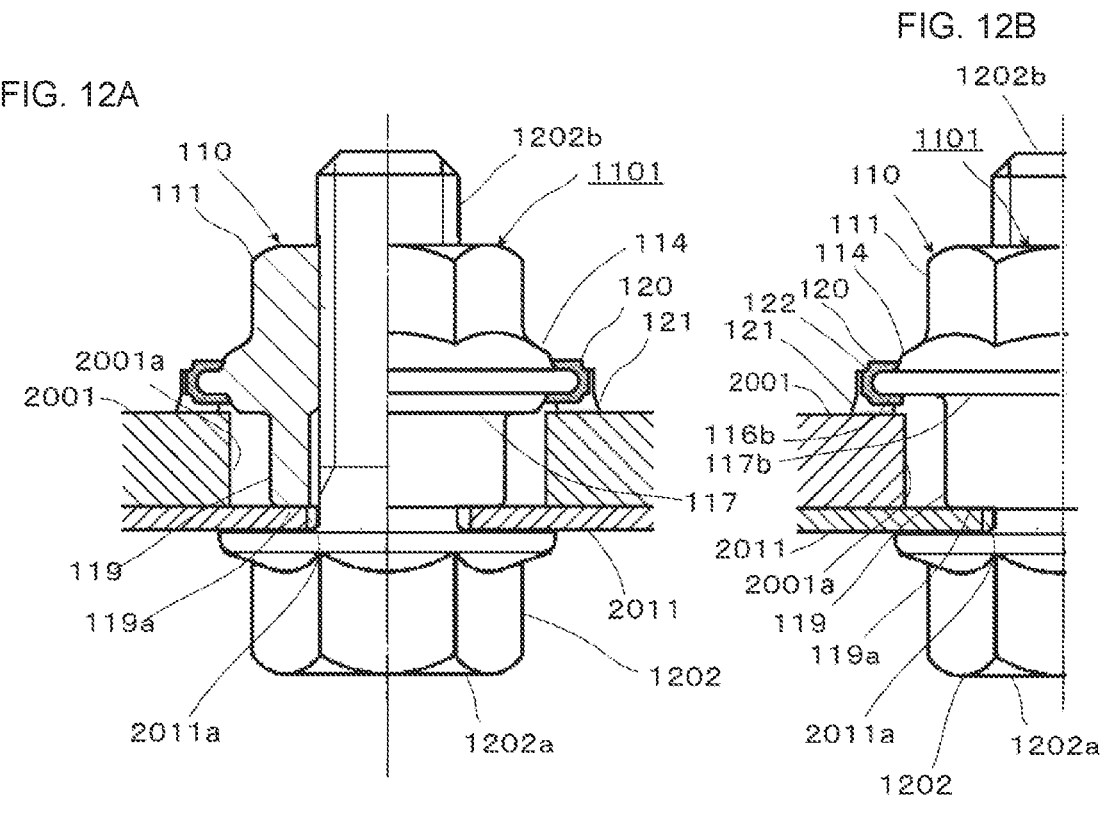
FIG. 12B
FIG. 12C
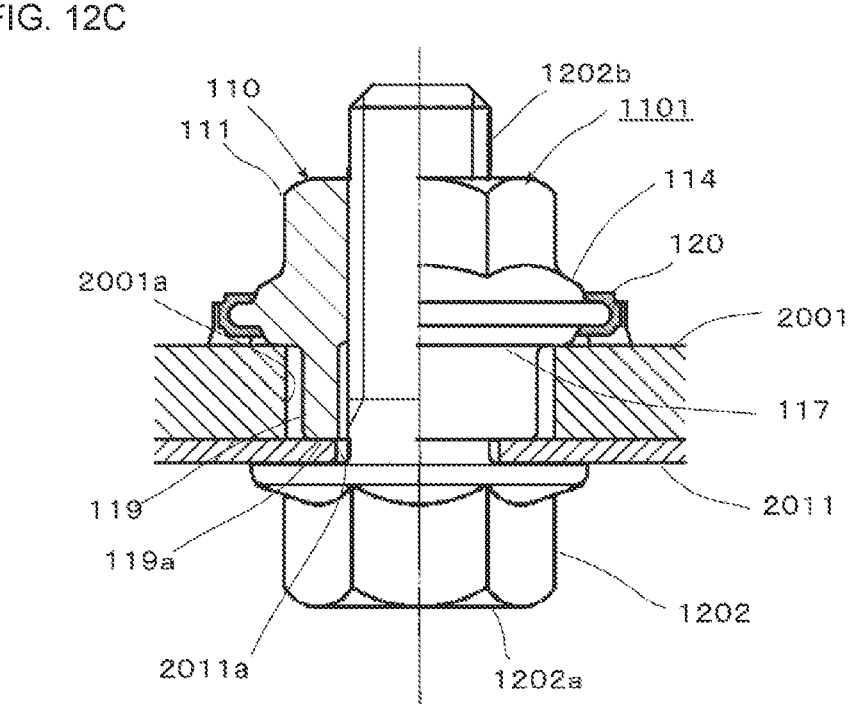

FIG. 13A
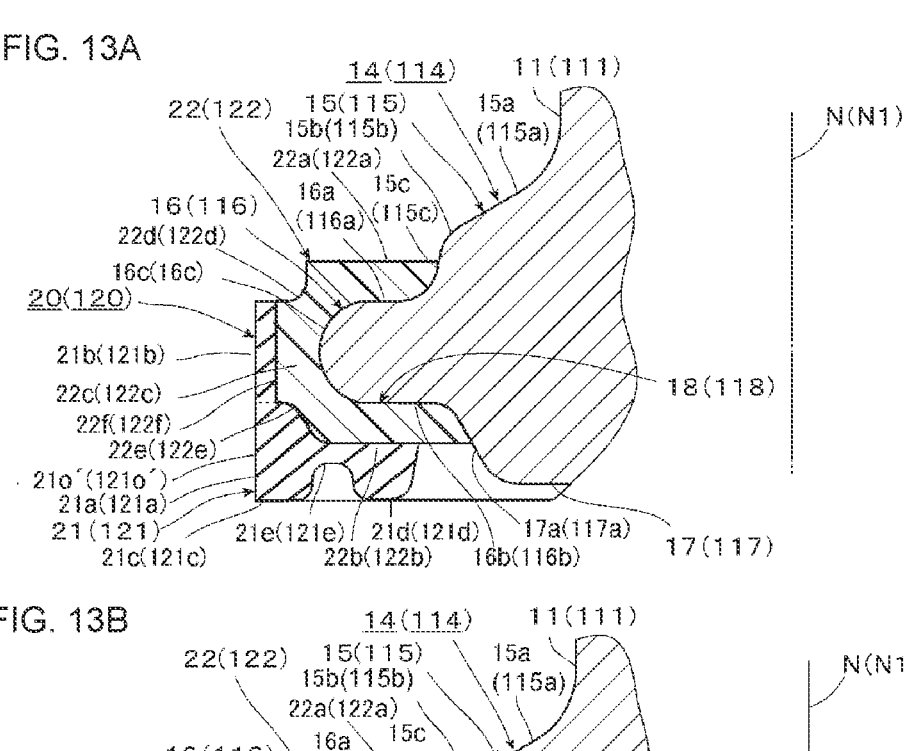
FIG. 13B
FIG. 13C
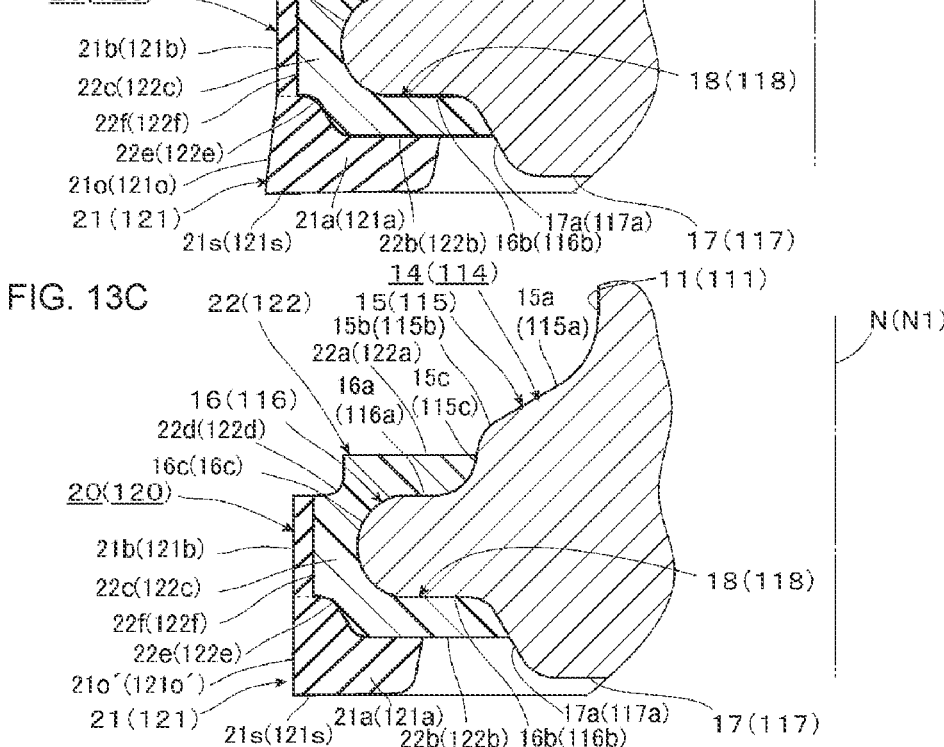

(D)

1

THREADED FASTENER, AND FUNCTION ADDITION MEMBER OF THREADED FASTENER

CROSS-REFERENCE TO RELATED APPLICATIONS

This application is a National Stage of International Application No. PCT/JP2021/034042, filed Sep. 16, 2021 (now WO 2022/254739 A1), which claims priority to Japanese Application No. 2021-092464, filed Jun. 1, 2021. The entire disclosures of each of the above applications are incorporated herein by reference.

FIELD

The present disclosure relates to a screwing fastener such as a bolt, a nut, or the like, and particularly relates to a screwing fastener provided with a function adding member that adds sealing functions or insulating functions, and the function adding member used with the screwing fastener.

BACKGROUND

A bolt such as described in PTL 1, for example, is conventionally known as this type of screwing fastener. That is to say, the bolt described in PTL 1 is made up of a bolt main body that has a screw portion (shaft portion), a head portion that is formed on an upper end portion of the screw portion, and a flange portion that is formed on a lower end portion of the head portion, and a ring-shaped member made of non-electroconductive resin (function adding member) that encapsulates an outer circumferential portion of the flange portion. The ring-shaped member made of resin is provided with an edge portion that is situated on a lower end side of the screw portion from a seat face and on an outer side of the flange main body portion, and an annular skirt portion that increases in diameter toward the edge portion. The annular skirt portion deforms so as to spread when being attached to an attachment object part for the bolt, thereby forming an annular liquid-tight seal portion with respect to the attachment object part. Also, PTL 2 applies a similar configuration to a nut as well.

CITATION LIST

Patent Literature

[PTL 1] Japanese Patent No. 5145226
[PTL 2] Japanese Patent No. 5276447

SUMMARY

Technical Problem

However, with the ring-shaped members made of resin for the bolt described in described in PTL 1 and the nut described in PTL 2 above, frictional force of the annular liquid-tight seal portion increases as tightening progresses, rotation of the annular liquid-tight seal portion is suppressed with respect to rotation of the flange portions of the bolt and the nut, and the ring-shaped member made of resin becomes greatly twisted in a circumferential direction between a portion of joining the flange portion and the annular liquid-tight seal portion. Accordingly, there have been problems such as a joining face that joins to the flange portion peeling away, or ruptures occurring in the ring-shaped member made of resin and tearing. Even if the joining face of the ring-shaped members made of resin does not peel away, deformation becomes great and the seal becomes defective. Also, due to the above phenomenon, fastening cannot be performed up to an axial force that is necessary for fastening, leading to defective fastening. Further, using a hard resin so as to not tear requires a high axial force, necessitating a high axial force to obtain the necessary axial force, consequently resulting in deformation and damage to the bolt due to insufficient bolt strength, and defective fastening.

It is an object of the present disclosure to provide a screwing fastener with a function adding member, and the function adding member of the screwing fastener, which are capable of preventing damage to the function adding member when tightening, and capable of maintaining suitable functions of the function adding member and a suitable fastened state.

Solution to Problem

In order to achieve the above object, the present disclosure is a screwing fastener, including a fastener main body having a seat face, a screw portion for tightening the fastener main body to a fastened member, a flange portion provided to the fastener main body, and a function adding member that is provided to the flange portion, the screwing fastener being tightened with the function adding member being compressed between the flange portion and the fastened member.

The function adding member has at least a two-layer structure of a first adding portion that is provided to the flange portion and has slidability, and a second adding portion that comes into contact with the fastened member.

According to the present disclosure, as frictional force increases at a contact portion of the second adding portion and the fastened member when tightening, sliding occurs at an interface of the contact portion of the first adding portion and the flange portion, an interface of the contact portion of the first adding portion and the second adding portion, or the like, whereby excessive twisting can be suppressed from occurring at the second adding portion, and there is no concern of the second adding portion being damaged. Also, the contact portion of the first adding portion and the flange portion, and the contact faces of the second adding portion and the first adding portion, are sealed by the tightening force.

The second adding portion is a seal portion having a sealing function of being in close contact with the fastened member and sealing off fluid. According to this arrangement, tightening force can be maintained without diminishing sealing functions.

The seal portion protrudes from the seat face of the fastener main body. The seal portion exhibits compression deformation when tightening, and the seat face of the fastener main unit is seated on the fastened member, whereby axial force can be reliably secured.

At least one of the first adding portion and the second adding portion is an insulator that has an insulating function. The first adding portion that has slidability may be an insulator, or the second adding portion may be an insulator. Insulation can be realized between screwing fastener material and the fastened member due to being an insulator. Also, when the second adding portion has insulating functions, contact corrosion with the fastened member can be prevented from occurring.

The first adding portion can be configured to be rotationally slidably in contact with the flange portion. Damage of the seal portion can be reliably prevented by causing sliding at an interface of the sliding portion and the flange portion that is made of metal.

Also, the function adding member can be configured to be detachably attachable to the flange portion. According to this arrangement, the function adding member can be replaced.

Also, another disclosure is a function adding member that is attached to a flange portion of a screwing fastener. The function adding member has at least a two-layer structure of a first adding portion that is in contact with the flange portion and has slidability, and a second adding portion that comes into contact with the fastened member.

Advantageous Effects of the Disclosure

According to the present disclosure, as well as preventing damage to the function adding member in contact with a fastened member, the functions thereof can be maintained, and a suitable fastened state can be maintained.

BRIEF DESCRIPTION OF THE DRAWINGS

FIG. 1 illustrates a screwing fastener according to Embodiment 1 of the present disclosure, in which

FIG. 2 exemplifies a fastening configuration of a bolt, in which

FIG. 3 illustrates a screwing fastener according to Embodiment 2 of the present disclosure, in which FIG. 3(A) is a frontal view, illustrating a seal function adding member in cross-sectional view, FIG. 3(B) is a top view of a side opposite to a seat, FIG. 3(C) is a cross-sectional view of FIG. 3(A), FIG. 3(D) is a principal-portion enlarged cross-sectional view of an attaching portion of the seal function adding member in FIG. 3(A), and FIG. 3(E) is an enlarged cross-sectional view of a proximity of an engaging portion of a seal portion.

FIG. 6 illustrates a screwing fastener according to Embodiment 3 of the present disclosure, in which

FIG. 8 illustrates a screwing fastener according to Embodiment 4 of the present disclosure, in which

FIG. 9(A) and FIG. 9 (B) are reference examples of a fastening structures of a welding member fixing jig of a resistance welder using a bolt and a nut, and FIG. 9(C) is a configuration example of a fastening structure using the nut and the bolt with the insulation function adding member according to the present Embodiment 3.

FIG. 10(A) is an explanatory diagram of a case of assembling the insulation function adding member to the bolt, FIG. 10(B) is an explanatory diagram of a case of assembling the insulation function adding member to the nut, FIG. 10(C) is a plan view illustrating an example of an insulation portion of which a contact face is non-continuous in a circumferential direction, and FIG. 10(D) in the same figure is a circumferential-direction cross-sectional view of a contact face along line D-D in FIG. 10(C) in the same figure.

FIG. 12(A) is a longitudinal-sectional view of a fastened state of a nut according to a modification of Embodiment 2, FIG. 12(B) is a half longitudinal-sectional view illustrating an example of a stepped nut in which a flange portion in FIG. 12(A) is not provided with a seat face, and FIG. 12(C) is a longitudinal-sectional view of another usage example of the nut in FIG. 12(A).

FIG. 13(A) to FIG. 13(C) are partial cross-sectional views illustrating various types of modifications of the seal portions according to Embodiments 1 and 2.

DETAILED DESCRIPTION

The present disclosure will be described below in detail by way of illustrated Embodiments.

Dimensions, materials, and shapes, of components described in the Embodiments below, and relative placement thereof and so forth, should be changed as appropriate in accordance with configurations of devices to which the disclosure is to be applied, and various types of conditions, and limiting the scope of this disclosure to the embodiments below is not intended.

FIG. 1 illustrates a screwing fastener according to Embodiment 1 of the present disclosure. This Embodiment 1 is an application of the present disclosure to a bolt, which is an example of a male screw member.

Figures 1A, 1B, 1C, 1D:
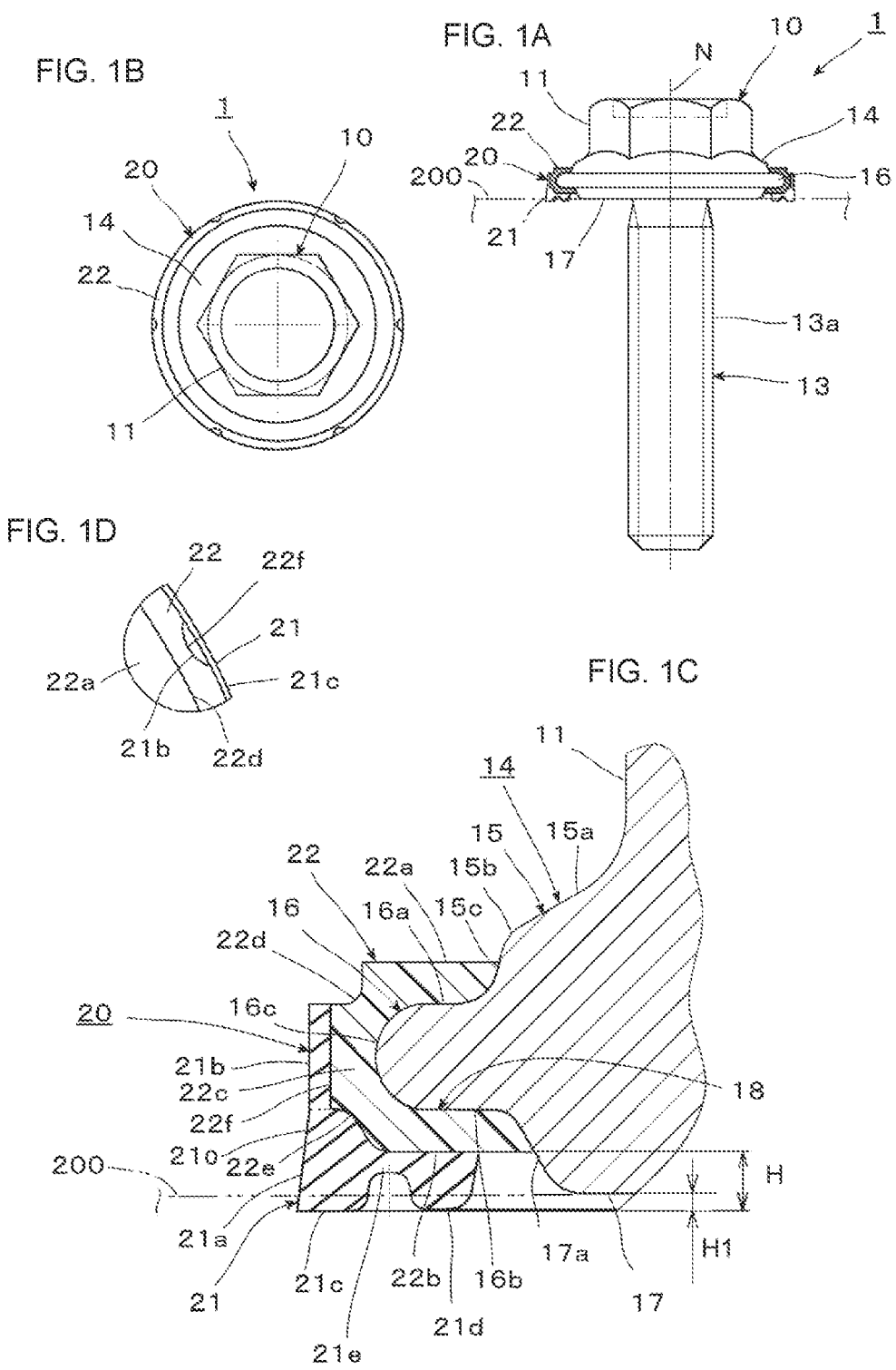
FIG. 1(A) is a frontal view, illustrating a seal function adding member in cross-sectional view.
FIG. 1(B) is a top view of a head portion side.
FIG. 1(C) is a partial enlarged view of a seal portion attaching portion in FIG. 1(A)
FIG. 1(D) is an enlarged cross-sectional view of a spin stopper for a seal portion and a sliding portion.

First, an overall configuration will be described with reference to FIG. 1(A) and FIG. 1(B). FIG. 1(A) is a frontal view, illustrating a seal function adding member of the bolt in cross-sectional view, and FIG. 1 (B) is a top view of a head portion side of the bolt.

In the figures, 1 indicates an entire bolt serving as the screwing fastener. This bolt 1 is provided with a head portion 10 that has a seat face 17 and that serves as a fastener main body, and a shaft portion 13 on which is formed a male thread 13a that tightens the seat face 17 of the head portion 10 against a fastened member 200. A flange portion 14 is provided to the head portion 10, and a seal function adding member 20 that is annular in shape is mounted to this flange portion 14 as a function adding member, configured such that the seal function adding member 20 comes into close contact with the fastened member 200 when tightening, thereby sealing off fluids. Fluids that are sealed off include liquids such as water and so forth, and gasses such as air and so forth. The seal function adding member 20 has at least a two-layer structure, of a sliding portion 22 serving as a first adding portion that comes into contact with the flange portion 14, and a seal portion 21 serving as a second adding portion that comes into contact with the fastened member 200. The head portion 10 including the flange portion 14, and the shaft portion 13, are made of metal.

The head portion 10 has a head portion main body 11 that has a shape of a hexagonal post, for transmitting torque from a tightening tool, and the flange portion 14 that has a shape of a cone that extends outward with a larger diameter than a diagonal distance of the head portion main body 11, forming the seat face 17 that is flat, by which a side face of a shaft portion side of the flange portion 14 comes into contact with the fastened member. The seat face 17 is on a plane that is orthogonal to a center axial line N of the shaft portion 13, or has an angle inclined as to the shaft portion 13 side. The inclination is an inclination in a direction such that a basal portion side is recessed. The seat face 17 may be a face that has asperities.

Next, a configuration of the seal function adding member and an attaching portion of the seal function adding member will be described in detail with reference to FIG. 1(C). FIG. 1(C) is a partial enlarged cross-sectional view of a seal function adding member attaching portion.

The flange portion 14 is provided with a flange main body 15 that extends outward in a truncated cone shape and that is thick, and an annular protruding portion 16 that protrudes outward from an outer circumference of the flange main body 15. The annular protruding portion 16 is thinner than the thickness of the flange main body 15, and extends outward from partway along a height direction of the outer circumference of the flange main body 15 over the entire circumference thereof. A head-portion main-body-side side face 16a and a shaft-portion-side side face 16b of the annular protruding portion 16 are on faces orthogonal to the center axial line N, and an outer circumferential face 16c is a cross-sectional arc shape (cross-section taken along a plane passing through the center axial line N) projecting outward. A side face of the flange main body 15 on the head portion main body 11 side is a first inclined face 15a that is inclined in a direction gradually increasing in diameter toward the shaft portion 13, and a step wall 15c that has a predetermined height is provided between this first inclined face 15a and the head-portion main-body-side side face 16a of the annular protruding portion 16. A corner portion 15b of the step wall 15c and the first inclined face 15a is a projecting rounded shape, and an inner corner portion of the step wall 15c and the head-portion main-body-side side face 16a of the annular protruding portion 16 is a recessed rounded shape.

Also, a side face of the flange main body 15 on the shaft portion side is the seat face 17. The shaft-portion-side side face 16b of the annular protruding portion 16 is situated further on the head portion main body 11 side than the seat face 17 by a predetermined height, and a second inclined face 17a is formed between an outer edge of the seat face 17 and an inner edge of the shaft-portion-side side face 16b of the annular protruding portion 16, inclining in a direction gradually increasing in diameter from the seat face 17 side toward the annular protruding portion 16.

Next, the seal function adding member 20 will be described.

The sliding portion 22 of the seal function adding member 20 is an annular member with a cross-sectional letter-C shape, having a recessed portion 18 that fits with the annular protruding portion 16, and has an outer circumference covering portion 22c that covers the outer circumferential face 16c of the annular protruding portion 16, a first-side-face covering portion 22a that extends inward from one end of the outer circumference covering portion 22c and covers the head-portion main-body-side side face 16a of the annular protruding portion 16, and a second-side-face covering portion 22b that extends inward from another end of the outer circumference covering portion 22c and comes into contact with the shaft-portion-side side face 16b of the annular protruding portion 16.

An inner circumferential shape of the recessed portion 18 of the sliding portion 22 matches an outer circumferential shape of the annular protruding portion 16, and the seal function adding member 20 is capable of sliding in a rotational direction at an interface with the annular protruding portion 16. An inner circumferential face of the outer circumference covering portion 22c is a cross-sectional arc shape that is modeled after the outer circumferential face 16c of the annular protruding portion 16, inner side faces of the first-side-face covering portion 22a and the second-side-face covering portion 22b are flat faces modeled after the head-portion main-body-side side face 16a and the shaft-portion-side side face 16b of the annular protruding portion 16, and the seal function adding member 20 smoothly slides in a state of being in contact with the entire circumference of the annular protruding portion 16.

Also, to describe an outer circumferential shape of the sliding portion 22, an outer circumferential face of the outer circumference covering portion 22c is a cylindrical face, and outer circumferential faces of the first-side-face covering portion 22a and the second-side-face covering portion 22b are faces orthogonal to the center axial line N. A first notch 22d that is a recessed curved face shape is provided at a corner portion of the outer circumferential face of the outer circumference covering portion 22c and the outer circumferential face of the first-side-face covering portion 22a. Also, a second notch 22e that is a recessed curved face shape is provided at a corner portion of the outer circumferential face of the outer circumference covering portion 22c and the second-side-face covering portion 22b, as well. An angle portion of this second notch 22e and the second-side-face covering portion 22b is a protruding curved face shape.

The outer circumferential shape of this sliding portion 22 does not serve as a sliding face, and accordingly, the cross-sectional shape orthogonal to the center axial line N may be, for example, a polygonal shape such as square, triangular, or the like, or may be a recessed and protruding shape with serrations provided on the outer circumference, and various types of shapes can be selected.

The height of an outer side face of the first-side-face covering portion 22a is set to a position that is lower than the corner portion 15b of the first inclined face 15a and the step wall 15c, and the size of the step between the first-side-face covering portion 22a and the corner portion 15b prevents the sliding portion 22 from interfering with a tool such as a socket or the like. Also, an end portion of the first-side-face covering portion 22a is a curved face shape modeled after the curved face shape of an inner corner portion of the head-portion main-body-side side face 16a of the annular protruding portion 16 and the step wall 15c, and is in close contact with the inner corner portion.

The height of an outer side face of the second-side-face covering portion 22b is at a position higher than the seat face 17 by a predetermined dimension. Also, an end portion of the second-side-face covering portion 22b is a curved face shape modeled after the curved face shape of an inner corner portion of the shaft-portion-side side face 16b of the annular protruding portion 16 and the second inclined face 17a, and is in close contact with the inner corner portion.

The seal portion 21 is provided with a seal main body 21a that is annular and that joins the second-side-face covering portion 22b of the sliding portion 22, and an engaging portion 21b that extends from the seal main body 21a to the outer circumference covering portion 22c side, and engages a groove 22f formed on an outer circumference of the outer circumference covering portion 22c. In the present embodiment, a joining portion of the second-side-face covering portion 22b and the seal portion 21 is a cohesion layer where the two cohere to each other.

The seal main body 21a is provided with a base portion 21e that is joined to the second-side-face covering portion 22b of the sliding portion 22, and a plurality of ribs, which are a first rib 21c and a second rib 21d in the illustrated example, that are annular and that protrude from the base portion 21e. The first rib 21c and the second rib 21d are disposed concentrically, centered on the center axial line N of the shaft portion 13, with the first rib 21c disposed on the outer side and the second rib 21d disposed on the inner side. Although two ribs are provided in the illustrated example, the number of ribs may be single, or may be three or more, in accordance with a layout of usage portions, or the shape of the bolt.

The first rib 21c protrudes toward an opposite side from the head portion main body 11, from the proximity of the second notch 22e at the corner portion of the outer circumference covering portion 22c and the second-side-face covering portion 22b of the sliding portion 22, with a distal end thereof protruding further than a plane passing through the seat face 17 by a predetermined dimension (H1). A distal end face of the first rib 21c is an inclined face that is inclined as to a plane that is orthogonal to the center axial line N, such that an outer edge side protrudes toward a screw end side. In any case, the distal end face of the first rib 21c may be a flat face that is orthogonal to the center axial line N, with the angle of inclination as to a plane that is orthogonal to the center axial line N including 0°, and being set to around 0° to 1°. Also, an outer circumferential face 210 of the first rib 21c is provided with a gradient so as to gradually increase in diameter in a direction toward the shaft portion 13 side, with respect to the cylindrical face that is orthogonal to the seat face 17 (parallel to the center axial line N). Also, a corner portion of the outer edge of the distal end face of the first rib 21c is an acute angle, and a corner portion of an inner edge of the distal end face is rounded. The corner portion on the outer edge of the distal end face of the first rib 21c may also be rounded or tapered.

The second rib 21d is disposed on an inner side of the first rib 21c, across a predetermined interval, and in view of coordinate positions in a radial direction, is disposed at a position corresponding to the second-side-face covering portion 22b of the sliding portion 22, protruding toward the opposite side from the head portion main body 11. A distal end face of the second rib 21d is set so as to be situated on an extending line from the distal end face of the first rib 21c. In a case in which the distal end face of the first rib 21c is a flat face that is orthogonal to the center axial line N, the protruding heights will be the same, and in a case in which the distal end face of the first rib 21c has a tapered shape in which the outer edge protrudes toward the screw end side, the distal end face of the second rib 21d will be a tapered shape on an extending line from the distal end face of the first rib 21c. The distal end face of the second rib 21d may be a flat face.

The inner diameter of the second rib 21d is larger than the inner diameter of the second-side-face covering portion 22b of the sliding portion 22. That is to say, the end portion on the inner diameter side of the second-side-face covering portion 22b of the sliding portion 22 is exposed without being covered by the seal portion 21, and slidably comes into contact with the second inclined face 17a of a circumferential edge of the seat face 17. Assuming that as far as the end portion on the inner diameter side of the second-side-face covering portion 22b were covered by the second rib 21d of the seal portion 21, the second rib 21d would come into contact with the second inclined face 17a of the seat face 17, and the sliding portion 22 would not readily slide due to frictional force thereof.

With the protruding height of the first rib 21c and the second rib 21d from the second-side-face covering portion 22b of the sliding portion 22 as (H), the aforementioned protruding height (H1) of the first rib 21c and the second rib 21d from the seat face 17 is preferably in a range of (H1/H)=5 to 70%, and more preferably is in a range of 10 to 40%.

The engaging portion 21b of the seal portion 21 is equidistantly disposed at a plurality of locations in a circumferential direction, six locations in the illustrated example, functioning as spin stoppers that restrict relative rotation of the seal portion 21 and the sliding portion 22. The groove 22f formed on the outer circumferential face of the outer circumference covering portion 22c is arc-shaped as illustrated in FIG. 1(D), and the inner circumferential shape of the engaging portion 21b is also formed arc-shaped, modeled after the groove 22f, with the outer circumferential shape being formed arc-shaped modeled after the cylindrical outer circumferential face of the outer circumference covering portion 22c of the sliding portion 22. The groove 22f and the engaging portion 21b are not limited to arc shapes, and various types of shapes can be applied such as square, triangular, croze, or the like, that engage each other.

The seal portion 21 described above is a sealing material that is in close contact with a surface of the fastened member 200, and various types of material used for sealing can be used. Examples of materials that can be used for the seal portion 21 include common rubber materials such as nitrile rubber, silicone rubber, urethane rubber, and so forth, resin materials such as fluororesin, polyethylene, and so forth, thermoplastic elastomer, and so forth.

Also, the sliding portion 22 is a portion that functions to slide over the contact face of the flange portion 14 and the annular protruding portion 16, by friction acting on the seal portion 21 when tightening. Various types of resin materials having self-lubricating properties can be used for the sliding portion 22, including PTFE (polytetrafluoroethylene) polyamide (PA) polyacetal (POM), elastomers, and further thermosetting resins and so forth.

For example, in a case of using thermoplastic elastomer as the materials of the seal portion 21 and the sliding portion 22, the seal portion 21 is preferably imparted with flexibility by setting the hardness thereof to be low, and the sliding portion 22 is preferably imparted with slidability by setting the hardness thereof to be high.

In the present embodiment, the seal portion 21 and the sliding portion 22 are formed by insertion molding, although not illustrated in particular. That is to say, the sliding portion 22 of the seal function adding member 20 is first formed on the annular protruding portion 16 of the flange portion 14 of the bolt 1 by insertion molding. Thereafter, the seal portion 21 is formed on an intermediate body of the bolt on which the sliding portion 22 was formed by insertion molding. Thus, no process of assembling the seal function adding member 20 is necessary, and manufacturing is facilitated. A surface of the annular protruding portion 16 of the flange portion 14 is a smooth face, and the sliding portion 22 that is formed is rotatably slidable without being adhered.

Note that the seal portion 21 is not limited to such an insertion molded article, and may be applied to the sliding portion 22 using double-sided tape, adhesive agent, or the like, in a case of a material that does not lend itself to injection molding, such as Si rubber or the like, for example.

Next, operations of the bolt according to the present embodiment will be described.

Figure 2A:
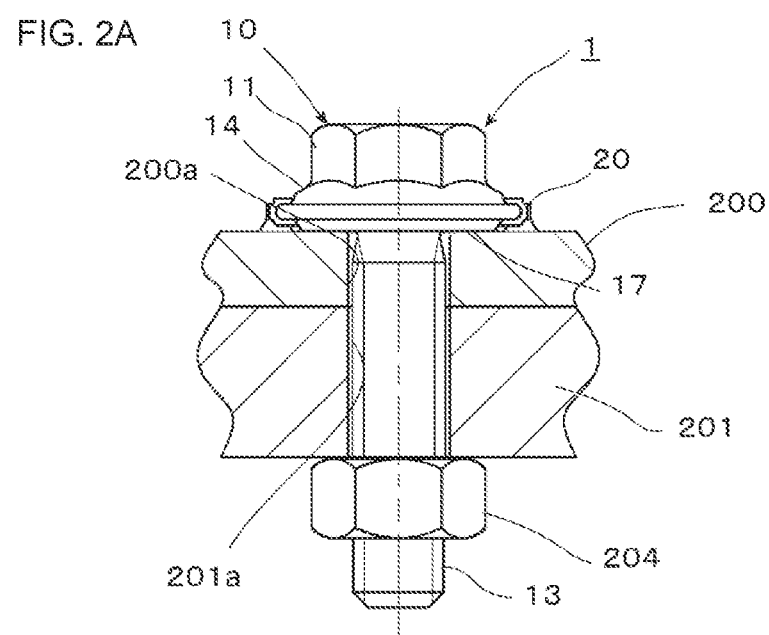
FIG. 2(A) is a schematic cross-sectional view of an overall configuration.
Figure 2B:
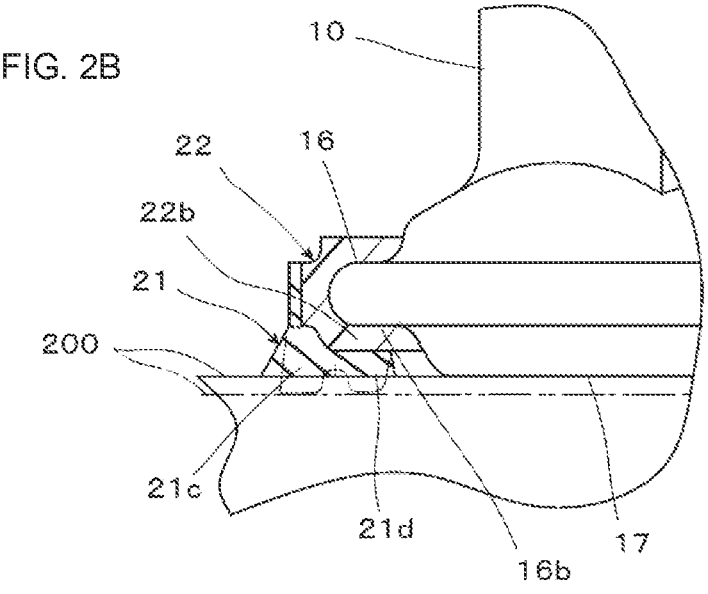
FIG. 2(B) is an enlarged cross-sectional view of principal portions.

FIG. 2 exemplifies a fastening configuration of the bolt 1, in which FIG. 2(A) is a schematic cross-sectional view of an overall configuration, and FIG. 2(B) is an enlarged cross-sectional view of principal portions.

In this fastening configuration, as illustrated in FIG. 2(A), the fastened member 200 is overlaid on a fixing member 201, the shaft portion 13 of the bolt 1 is passed through a hole 200a in the fastened member 200 and a hole 201a in the fixing member 201 over which the fastened member 200 has been laid, and screwed into a nut 204 that is fixed to the fixing member 201 (a weld nut or the like), and tightened and fixed. The fastening configuration is not limited to the illustrated example, and a screw hole may be directly formed on the fixing member 201, without using the nut 204.

In the process of tightening, immediately before the seat face 17 reaches the fastened member 200, the distal ends of the first rib 21c and the second rib 21d of the seal portion 21 come into contact with the fastened member 200, as indicated by the chain double-dashed line in FIG. 2(B). Further, due to tightening, the first rib 21c and the second rib 21d are compressed, the seat face 17 comes into contact with the fastened member 200, and finally fastening is performed to a predetermined axial force, thereby ending the tightening work. In a tightening-completed state, the first rib 21c and the second rib 21d are in contact with the fastened member 200, in a state with little gap or no gap between the ribs, as indicated by a solid line.

In the present embodiment, when frictional force of the first rib 21c and the second rib 21d in contact with the fastened member 200 increases when tightening, the interface at the contact portion of the sliding portion 22 and the annular protruding portion 16 slides, and excessive twisting can be prevented from occurring at the seal portion 21 that is soft in nature and that makes up the seal function adding member 20. Also, contact surface pressure at the contact portion of the sliding portion 22 and the annular protruding portion 16, i.e., contact surface pressure of the interface between the shaft-portion-side side face 16b of the annular protruding portion 16 and the second-side-face covering portion 22b of the sliding portion 22 increases so as to be in close contact without space therebetween, and fluids such as water, air, or the like can be sealed off.

Also, the seat face 17 that is made of metal comes into contact with the fastened member 200 and accordingly appropriate axial force can be ensured, and a high axial force can be set. Also, the first rib 21c and the second rib 21d of the seal portion 21 are compressed in the process of obtaining an appropriate load.

Further, an outer circumferential face of the first rib 21c has a gradient opening in an outward direction in a protruding direction, and accordingly, an outward-opening angle becomes greater when being compressed by the fastened member 200. Accordingly, if the fastened member 200 to which the bolt 1 is attached happens to be submerged in water, water pressure acts in a direction of pressing the first rib 21c against the fastened member 200, thus increasing the contact surface pressure, and thereby infiltration of water can be prevented.

Note that in a case of using the above-described rubber materials, elastomers, resin materials, or the like, as the materials of the seal portion 21 and the sliding portion 22, these materials are electrical insulating materials with high electrical resistance, and the seal function adding member 20 according to the present Embodiment 1 has not only sealing functions but also electrical insulating functions.

Accordingly, contact corrosion (electrical corrosion) at a contact portion between the seal function adding member 20 and the fastened member 200 is prevented. Also, in a case in which the surface of the fastened member 200 or the seat face 17 of the head portion 10 is coated with an insulating covering such as a cationic coating or the like, for example, insulation of the head portion 10 and the fastened member 200 can be realized.

Modification of Embodiment 1

Figures 11A, 11B, 11C, 11D:
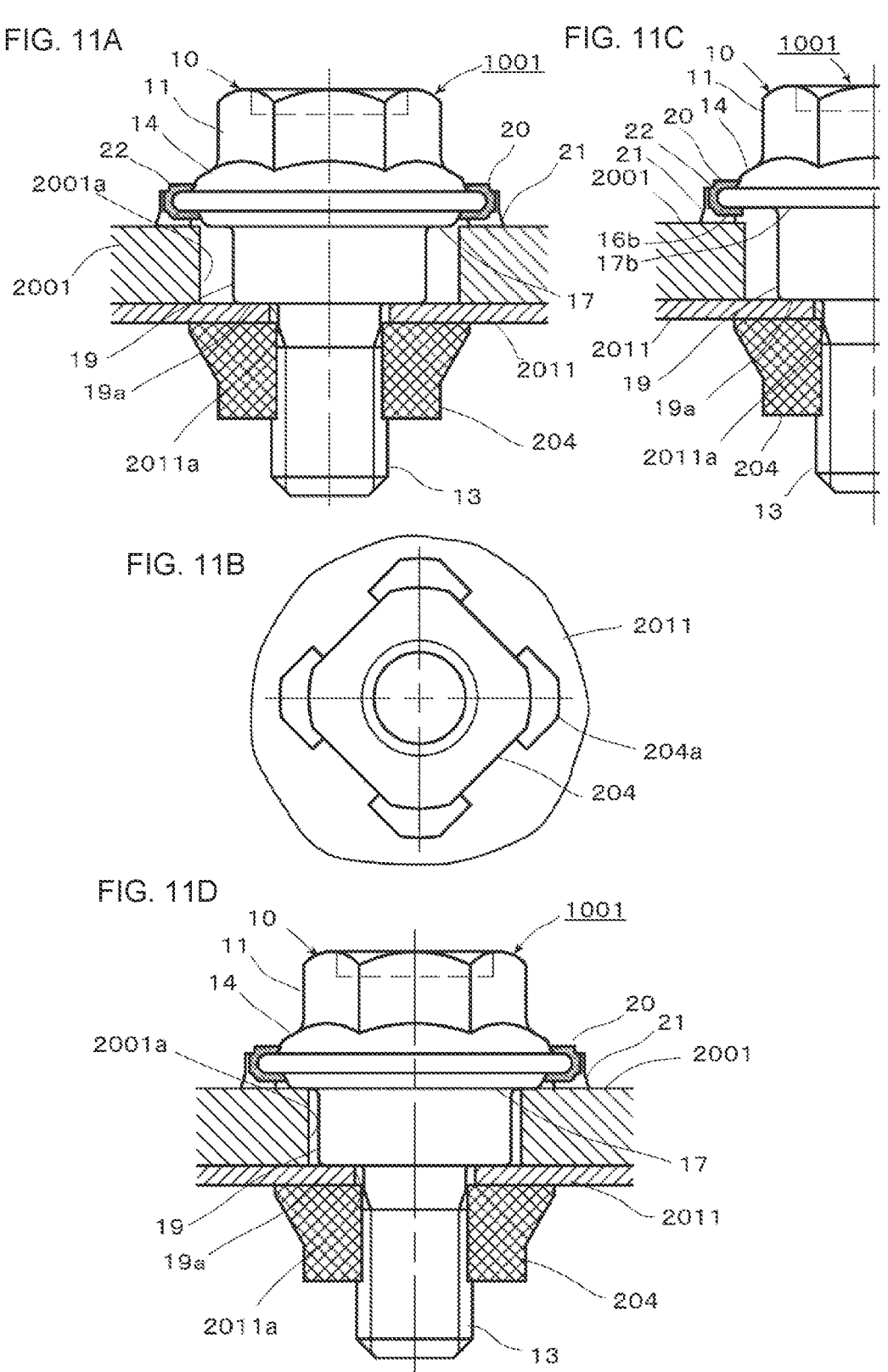
FIG. 11(A) is a longitudinal-sectional view of a fastened state of a bolt according to a modification of Embodiment 1.
FIG. 11(B) is a bottom view of a nut.
FIG. 11(C) is a half longitudinal-sectional view illustrating an example of a stepped bolt in which a flange portion in FIG. 11(A) is not provided with a seat face.
FIG. 11(D) is a longitudinal-sectional view of another usage example of the bolt in FIG. 11(A).

FIG. 11 illustrates a modification of Embodiment 1. FIG. 11(A) is a cross-sectional view, and FIG. 11(B) is a bottom view of a nut. Basic configurations are the same as in Embodiment 1, and accordingly components that are the same are denoted by the same signs, and points of difference will be described.

This modification is an example of a bolt 1001 used for fastening a fastened member 2001 made of CFRP that is relatively thick, to a fixing member 2011 that is a thin plate. In the illustrated example, a weld nut 204 is fixed to the fixing member 2011. The weld nut 204 has weld portions 204a on an outer circumference thereof, and is fixed to the fixing member 2011 by welding.

The fastened member 2001 made of CFRP is a material in which electrical corrosion advances under no more than moisture in the air, and cannot be brought into contact with the seat face 17. Accordingly, a configuration is made in which a stepped portion 19 is further provided on the seat face 17 of the head portion 10, a seat face 19a of this stepped portion 19 is seated on the fixing member 2011 and axial force is applied, the seat face 17 on the head portion side is contactless with the fastened member 2001 made of CFRP, only the seal function adding member 20 comes into contact with the fastened member 2001, and the fastened member 2001 made of CFRP is restrained via this seal function adding member 20.

The thickness of the stepped portion 19 is around the thickness of the fastened member 2001, and the diameter thereof is a smaller diameter than that of the seat face 17 on the head portion side and a larger diameter than that of the shaft portion 13. Also, a hole diameter of a hole 2001*a* in the fastened member 2001 through which the stepped portion 19 passes is a larger diameter than an outer diameter of the stepped portion 19, and is set to be no greater than an inner diameter of the seal portion 21 of the seal function adding member 20, up to an inner end of the seal portion 21 being in contact with the fastened member 2001. The hole diameter of the hole 2001*a* may be larger in diameter than the inner diameter of the seal portion 21, with part of a region of the inner diameter side of the seal portion 21, around half thereof for example, overlapping on the hole 2001*a*. Also, a hole diameter of a hole 2011*a* of the fixing member 2011 through which the shaft portion passes is smaller in diameter than the outer diameter of the stepped portion 19.

With respect to the seat face 17 on the head portion side, the seat face 17 does not have to be provided, as illustrated in FIG. 11(C). In this case, a flange-side face 17*b* on the shaft portion side of the flange main body is situated on the same plane as the shaft-portion-side side face 16*b* of the annular protruding portion 16, in the same way as in the example in FIG. 6 regarding electrical corrosion prevention.

Note that the fastened member 2001 is not limited to CFRP material, and is applicable to material which electrical corrosion advances under no more than moisture in the air.

In a case of using material regarding which electrical corrosion does not advance under no more than moisture in the air (e.g., GFRP), the seat face 17 of the head portion 10 may come into contact with the fastened member 2001, as illustrated in FIG. 11(D). In this case as well, axial force is obtained by the seat face 19*a* of the stepped portion 19 being seated to the fixing member 2011. The seat face 17 of the head portion side acts to restrain the fastened member 2001. At this time, even if creeping occurs due to deterioration over time of the fastened member 2001, the role of restraining by the seal function adding member 20 can be maintained.

Note that as a portion for transmitting torque from a tool to the head portion main body 11, an outer periphery of the head portion main body 11 is a hexagonal head in the above embodiment, but may be special shapes such as a square shape, a hexalobular shape, or the like. Also, as a portion for transmitting torque, a configuration may be made where, instead of transmitting torque from the outer periphery of the head portion main body 11, a bit hole such as a cruciform hole, a hexagonal hole, hexalobular hole, a square hole, or the like, is formed at a top face of the head portion main body 11. In this case, the present disclosure is applicable regarding various types of head portion shapes of the head portion main body 11, such as a hemispherical-shaped round head, a fillister head, a pan head, and so forth.

Also, while description has been made by way of an example of a bolt, application can be made to tapping screws and so forth as well, the point being that application can be broadly made to various types of male screw members that have a head portion serving as a fastener main body that has a seat face, a shaft portion on which a male screw is formed to tighten the seat face of the head portion as to the fastened member 200, and a flange portion that is provided on the head portion to broaden the area of the seat face, with a seal function adding member that is annular in shape being mounted to the flange portion.

Embodiment 2

Next, a screwing fastener according to Embodiment 2 of the present disclosure will be described.

FIG. 3 illustrates the screwing fastener according to Embodiment 2 of the present disclosure. This Embodiment 2 is an application of the present disclosure to a nut, which is an example of a female screw member.

First, an overall configuration will be described with reference to FIG. 3(A) to FIG. 3(C). FIG. 3(A) is a frontal view, illustrating a seal function adding member of the nut in cross-sectional view, FIG. 3(B) is a top view of a side of the nut opposite to a seat, FIG. 3(C) is a cross-sectional view of the nut in FIG. 3(A).

In the figures, 101 indicates an entire nut serving as a screwing fastener. This nut 101 is provided with a nut main body 110 that has a seat face 117, and a screw hole 113 in which is formed a female thread 113*a* that tightens the seat face 117 of the nut main body 110 against the fastened member 200. A flange portion 114 is provided to the nut main body 110, and a seal function adding member 120 that is annular in shape is mounted to this flange portion 114, configured such that the seal function adding member 120 comes into close contact with the fastened member 200 when tightening, thereby sealing off fluids. Fluids that are sealed off include liquids such as water and so forth, and gasses such as air and so forth. In this Embodiment 2, the nut main body 110 corresponds to a female screw main body of the fastener main body according to the present disclosure, and the screw hole 113 corresponds to a screw portion. The seal function adding member 120 has at least a two-layer structure, of a sliding portion 122 serving as a first adding portion that comes into contact with the flange portion 114, and a seal portion 121 serving as a second adding portion that comes into contact with the fastened member 200. The nut main body 110 including the flange portion 114 is made of metal.

The nut main body 110 has a tubular body 111 that has a shape of a hexagonal tube, for transmitting torque from a tightening tool, and the flange portion 114 that has a shape of a cone that extends outward with a larger diameter than a diagonal distance of the tubular body 111, forming the seat face 117 that is flat, by which a side face of the flange portion 114 comes into contact with the fastened member 200. The seat face 117 is on a plane that is orthogonal to a center axial line N1 of the screw hole 113, or has an angle that is inclined toward the screw hole 113. The inclination is an inclination in a direction such that the screw hole 113 side is recessed. The seat face 117 may be a face that has asperities.

Next, a configuration of the seal function adding member and an attaching portion of the seal function adding member will be described in detail with reference to FIG. 3(D). FIG. 3(D) is a partial enlarged cross-sectional view of the seal function adding member attaching portion.

The flange portion 114 is provided with a flange main body 115 that extends outward in a truncated cone shape and that is thick, and an annular protruding portion 116 that protrudes outward from an outer circumference of the flange main body 115. The annular protruding portion 116 is thinner than the thickness of the flange main body 115, and extends outward from partway along the height direction of the outer circumference of the flange main body 115 over the entire circumference thereof. A tubular-body-side side face 116*a* and a seat-face-side side face 116*b* of the annular protruding portion 116 are on faces parallel to the seat face 117 that is orthogonal to the center axial line N1, and an outer circumferential face 116*c* is a cross-sectional arc shape (cross-section taken along a plane passing through the center axial line N1) projecting outward.

A side face of the flange main body 115 on the tubular body 111 side is a first inclined face 115*a* that is inclined in a direction gradually increasing in diameter toward the seat face 117, and a step wall 115*c* that has a predetermined height is provided between this first inclined face 115*a* and the tubular-body-side side face 116*a* of the annular protruding portion 116. A corner portion 115*b* of the step wall 115*c* and the first inclined face 115*a* is a projecting curved-face shape, and an inner corner portion of the step wall 115*c* and the tubular-body-side side face 116*a* of the annular protruding portion 116 is a recessed curved-face shape.

Also, the side face of the flange main body 115 on the opposite side from the tubular body 111 is the seat face 117. The seat-face-side side face 116*b* of the annular protruding portion 116 is situated further on the tubular body 111 side than the seat face 117 by a predetermined height, and a second inclined face 117*a* is formed between an outer edge of the seat face 117 and an inner edge of the seat-face-side side face 116*b* of the annular protruding portion 116, inclining in a direction gradually increasing in diameter from the seat face 117 side toward the annular protruding portion 116.

Next, the seal function adding member 120 will be described.

The sliding portion 122 of the seal function adding member 120 is an annular member with a cross-sectional letter-C shape, having a recessed portion 118 that fits with the annular protruding portion 116, and has an outer circumference covering portion 122*c* that covers the outer circumferential face 116*c* of the annular protruding portion 116, a first-side-face covering portion 122*a* that extends inward from one end of the tubular body 111 and covers the tubular-body-side side face 116*a* of the annular protruding portion 116, and a second-side-face covering portion 122*b* that extends inward from another end of the annular protruding portion 116 and comes into contact with the seat-face-side side face 116*b*.

An inner circumferential shape of the recessed portion 118 of the sliding portion 122 matches an outer circumferential shape of the annular protruding portion 116, and the seal function adding member 120 is capable of sliding in the rotational direction at an interface with the annular protruding portion 116. That is to say, an inner circumferential face of the outer circumference covering portion 122*c* is a cross-sectional arc shape that is modeled after the outer circumferential face 116*c* of the annular protruding portion 116, inner side faces of the first-side-face covering portion 122*a* and the second-side-face covering portion 122*b* are annular flat faces modeled after the tubular-body-side side face 116*a* and the seat-face-side side face 116*b* of the annular protruding portion 116, and the seal function adding member 120 smoothly slides in a state of being in contact with the entire circumference of the annular protruding portion 116.

Also, to describe an outer circumferential shape of the sliding portion 122, an outer circumferential face of the outer circumference covering portion 122*c* is a cylindrical face, and the outer circumferential faces of the first-side-face covering portion 122*a* and the second-side-face covering portion 122*b* are flat faces parallel to the seat face 117 that is orthogonal to the center axial line N1. A first notch 122*d* that is a recessed curved face shape is provided at a corner portion of the outer circumferential face of the outer circumference covering portion 122*c* that is cylindrical in shape, and an outer circumferential face of the first-side-face covering portion 122*a* that is disc-shaped. Also, a second notch 122*e* that is a recessed curved face shape is provided at a corner portion of the outer circumferential face of the outer circumference covering portion 122*c* and the second-side-face covering portion 122*b*, as well. An angle portion between this second notch 122*e* and the second-side-face covering portion 122*b* is a protruding curved face shape.

The outer circumferential shape of this sliding portion 22 does not serve as a sliding face, and accordingly, the cross-sectional shape orthogonal to the center axial line N1 may be, for example, a polygonal shape such as square, triangular, or the like, or may be a recessed and protruding shape with serrations provided on the outer circumference, and various types of shapes can be selected.

The height of an outer side face of the first-side-face covering portion 122*a* is set to a position that is lower than the corner portion 115*b* of the first inclined face 115*a* and the step wall 115*c*, and the size of the step between the first-side-face covering portion 122*a* and the corner portion 115*b* prevents the sliding portion 122 from interfering with a tool such as a socket or the like. Also, an end portion of the first-side-face covering portion 122*a* is a curved face shape modeled after the curved face shape of the inner corner portion of the tubular-body-side side face 116*a* of the annular protruding portion 116 and the step wall 115*c*, and is in close contact with the inner corner portion.

The height of an outer side face of the second-side-face covering portion 122*b* is at a position higher than the seat face 117 by a predetermined dimension. Also, an end portion of the second-side-face covering portion 122*b* is a curved face shape modeled after the curved face shape of an inner corner portion of the seat-face-side side face 116*b* of the annular protruding portion 116 and the second inclined face 117*a*, and is in close contact with the inner corner portion.

The seal portion 121 is provided with a seal main body 121*a* that is annular and that joins the second-side-face covering portion 122*b* of the sliding portion 122, and an engaging portion 121*b* that extends from the seal main body 121*a* to the outer circumference covering portion 122*c* side, and engages a groove 122*f* formed on an outer circumference of the outer circumference covering portion 122*c*. In the present embodiment, a joining portion of the second-side-face covering portion 122*b* and the seal portion 121 is a cohesion layer where the two cohere to each other.

The seal main body 121*a* is provided with a base portion 121*e* that is joined to the second-side-face covering portion 122*b* of the sliding portion 122, and a plurality of ribs, which are a first rib 121*c* and a second rib 121*d* in the illustrated example, that are annular and that protrude from the base portion 121*e*. The first rib 121*c* and the second rib 121*d* are disposed concentrically, centered on the center axial line N1 of the screw hole 113, with the first rib 121*c* disposed on the outer side and the second rib 121*d* disposed on the inner side. Although two ribs are provided in the illustrated example, the number of ribs may be single, or may be three or more, in accordance with a layout of usage portions, or the shape of the bolt.

The first rib 121*c* protrudes toward an opposite side from the tubular body 111, from the proximity of the second notch 122*e* of the sliding portion 122, with a distal end thereof protruding further than a plane passing through the seat face 117 by the predetermined dimension (H1). A distal end face of the first rib 121*c* is a flat face that is ring-shaped, and comes into planar contact with the fastened member 200. Also, an outer circumferential face of the first rib 121*c* is provided with a gradient that is inclined so as to gradually increase in diameter in a direction toward the protruding direction. Also, a corner portion of an outer edge of the distal end face of the first rib 121c is an acute angle, and a corner portion of an inner edge is rounded. The corner portion on the outer edge of the distal end face of the first rib 121c may also be rounded or tapered.

The second rib 121d is disposed on an inner side of the first rib 121c, across a predetermined interval, and in view of coordinate positions in the radial direction, is disposed at a position corresponding to the second-side-face covering portion 122b of the sliding portion 122, protruding toward the opposite side from the tubular body 111. A distal end face of the second rib 121d is set so as to be situated on an extending line from the distal end face of the first rib 121c. In a case in which the distal end face of the first rib 121c is a flat face that is orthogonal to the center axial line N1, the protruding heights will be the same, and in a case in which the distal end face of the first rib 121c has a tapered shape in which the outer edge protrudes toward the screw end side, the distal end face of the second rib 121d will be a tapered shape on an extending line from the distal end face of the first rib 121c. The distal end face of the second rib 121d may be a flat face.

An inner diameter of the second rib 121d is larger than an inner diameter of the second-side-face covering portion 122b of the sliding portion 122. That is to say, an end portion on the inner diameter side of the second-side-face covering portion 122b of the sliding portion 122 is exposed without being covered by the seal portion 121, and slidably comes into contact with the second inclined face 117a of a circumferential edge of the seat face 117. Assuming that as far as the end portion on the inner diameter side of the second-side-face covering portion 122b were covered by the second rib 121d of the seal portion 121, the second rib 121d would come into contact with the second inclined face 117a of the seat face 117, and the sliding portion 122 would not readily slide due to frictional force thereof.

With the protruding height of the first rib 121c and the second rib 121d from the second-side-face covering portion 122b of the sliding portion 122 as (H), the protruding height (H1) of the first rib 121c and the second rib 121d from the seat face 117 is preferably in a range of (H1/H)=5 to 70%, and more preferably is in a range of 10 to 40%, in the same way as in Embodiment 1.

The engaging portion 121b of the seal portion 121 is equidistantly disposed at a plurality of locations in the circumferential direction, six locations in the illustrated example, functioning as spin stoppers that restrict relative rotation of the seal portion 121 and the sliding portion 122. The groove 122f formed on the outer circumferential face of the outer circumference covering portion 122c of the sliding portion 122 is arc-shaped as illustrated in FIG. 3(E), and the inner circumferential shape of the engaging portion 121b is also formed arc-shaped, modeled after the groove 122f, with the outer circumferential shape being formed arc-shaped modeled after the cylindrical outer circumferential face of the outer circumference covering portion 122c of the sliding portion 122. The groove 122f and the engaging portion 121b are not limited to arc shapes either, and various types of shapes may be applied such as square, triangular, croze, or the like, that engage each other.

Note that the materials of the seal portion 121 and the sliding portion 122 are exactly the same as the sliding portion 22 and the seal portion 21 in Embodiment 1, and accordingly description will be omitted.

In the present Embodiment 2, the seal portion 121 and the sliding portion 122 are formed by insertion molding, although not illustrated in particular. That is to say, the sliding portion 122 of the seal function adding member 120 is first formed on the annular protruding portion 116 of the flange portion 114 of the nut 101 by insertion molding. Thereafter, the seal portion 121 is formed by insertion molding on an intermediate body of the nut on which the sliding portion 122 was formed. Thus, no process of assembling the seal function adding member 120 is necessary, and manufacturing is facilitated. A surface of the annular protruding portion 116 of the flange portion 114 is a smooth face, and the sliding portion 122 that is formed is rotatably slidable without being adhered.

Note that the seal portion 121 is not limited to such an insertion molded article, and may be applied to the sliding portion 122 using double-sided tape, adhesive agent, or the like, in a case of a material that does not lend itself to injection molding, such as Si rubber or the like, for example, in the same way as with Embodiment 1.

Next, operations of the nut according to the present Embodiment 2 will be described.

Figure 4A:
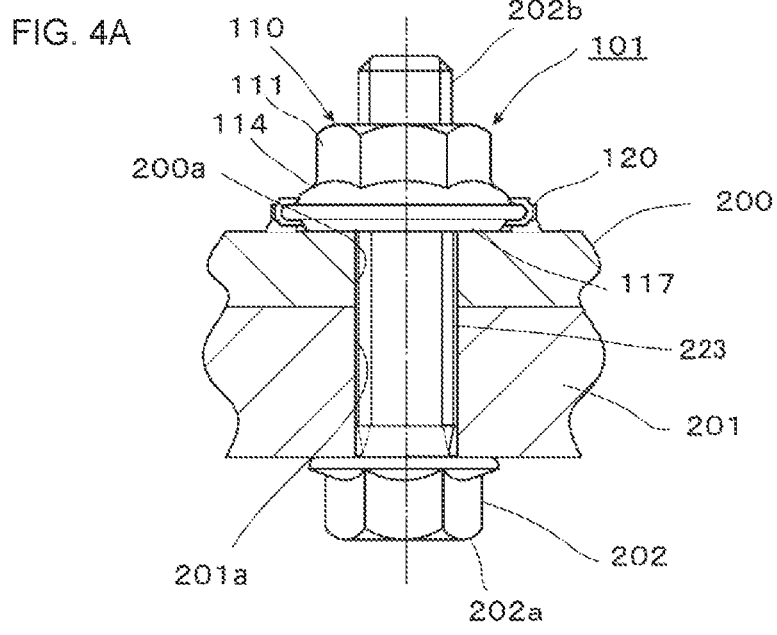
FIG. 4(A) is a cross-sectional view illustrating a usage example of the screwing fastener according to Embodiment 2.
Figure 4B:
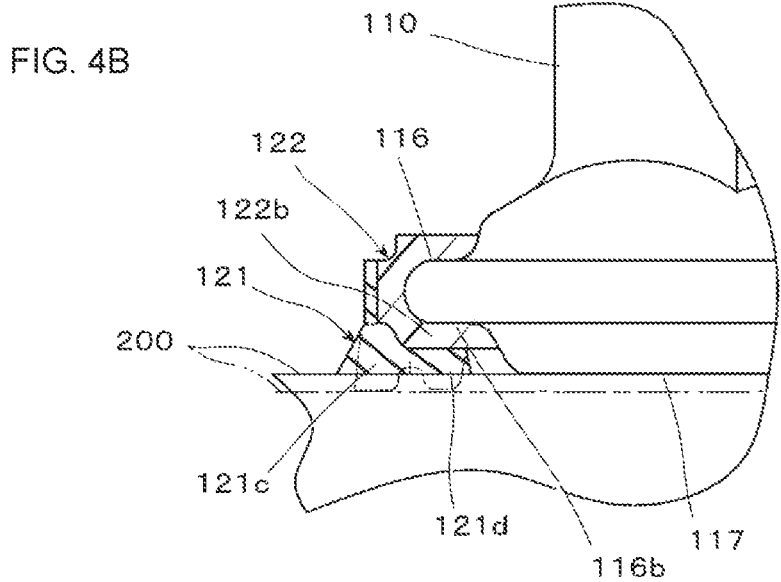
FIG. 4(B) is a partial enlarged cross-sectional view of FIG. 4(A).

FIG. 4 exemplifies a fastening configuration of the bolt 1, in which FIG. 4(A) is a schematic cross-sectional view of an overall configuration, and FIG. 4(B) is an enlarged cross-sectional view of principal portions.

In this fastening configuration, as illustrated in FIG. 4(A), the fastened member 200 is fastened to the fixing member 201 by the nut 101 according to the present Embodiment 2 and an ordinary bolt 202. That is to say, a head portion 202a of the bolt 202 is fixed to the fixing member 201, and a shaft portion 223 passes through the hole 201a in the fixing member 201 and the hole 200a in the fastened member 200, and protrudes to an upper face of the fastened member 200. The nut 101 is fastened to this protruding shaft portion 202b.

In the process of tightening the nut 101, immediately before the seat face 117 reaches the fastened member 200, the distal ends of the first rib 121c and the second rib 121d of the seal portion 121 come into contact with the fastened member 200, as indicated by the chain double-dashed line in FIG. 4(B). Further, due to tightening, the first rib 121c and the second rib 121d are compressed, the seat face 117 comes into contact with the fastened member 200, and finally fastening is performed to a predetermined axial force, thereby ending the tightening work. In the tightening-completed state, the first rib 121c and the second rib 121d are in contact with the fastened member 200, in a state with little gap or no gap between the ribs, as indicated by a solid line.

In the present embodiment, when frictional force of the first rib 121c and the second rib 121d in contact with the fastened member 200 increases when tightening, the interface at the contact portion of the sliding portion 122 and the annular protruding portion 116 slides, and excessive twisting can be prevented from occurring at the seal portion 121 that is soft in nature and that makes up the seal function adding member 120. Also, contact surface pressure at the contact portion of the sliding portion 122 and the annular protruding portion 116, i.e., contact surface pressure of the interface between the seat-face-side side face 116b of the annular protruding portion 116 and the second-side-face covering portion 122b of the sliding portion 122 increases so as to be in close contact, and fluids such as water, air, or the like can be sealed off.

Also, the seat face 117 that is made of metal comes into contact with the fastened member 200 and accordingly appropriate axial force can be ensured, and a high axial force can be set. Also, the first rib 121c and the second rib 121d of the seal portion 121 are compressed in the process of obtaining the appropriate load.

Further, the outer circumferential face of the first rib 121*c* has a gradient opening in an outward direction in the protruding direction, and accordingly, the outward-opening angle becomes greater when being compressed by the fastened member 200. Accordingly, if the fastened member 200 to which the nut 101 is attached happens to be submerged in water, the water pressure acts in a direction of pressing the first rib 121*c* against the fastened member 200, thus increasing the contact surface pressure, and thereby infiltration of water can be prevented.

Note that in a case of using the above-described rubber materials, elastomers, resin materials, or the like, as the materials of the seal portion 121 and the sliding portion 122, these materials are electrical insulating materials with high electrical resistance, and the seal function adding member 120 according to the present Embodiment 2 have not only sealing functions but also electrical insulating functions.

Accordingly, contact corrosion (electrical corrosion) between the seal function adding member 120 and the fastened member 200 is prevented. Also, in a case in which the surface of the fastened member 200 or the seat face 117 of the nut main body 110 is coated with an insulating covering such as a cationic coating or the like, for example, insulation of the nut main body 110 and the fastened member 200 can be realized.

Modification of Embodiment 2

FIG. 12 illustrates a modification of Embodiment 2. FIG. 12(A) is a cross-sectional view of a fastened state of the nut. Basic configurations are the same as in Embodiment 2, and accordingly components that are the same are denoted by the same signs, and points of difference will be described.

This modification is an example of a nut 1101 used for fastening the fastened member 2001 made of CFRP that is relatively thick, to the fixing member 2011 that is a thin plate. In the illustrated example, a head portion 1202*a* of a bolt 1202 is fixed to the fixing member 2011 by welding or the like.

The fastened member 2001 made of CFRP is a material in which electrical corrosion advances under no more than moisture in the air, and cannot be brought into contact with the seat face 117. Accordingly, a configuration is made in which a stepped portion 119 is further provided on the seat face 117 of the nut 1101, a seat face 119*a* of this stepped portion 119 is seated on the fixing member 2011 and axial force is applied, the seat face 117 on the nut side is contactless with the fastened member 2001 made of CFRP, only the seal function adding member 120 comes into contact with the fastened member 2001, and the fastened member 2001 made of CFRP is restrained via this seal function adding member 120.

The thickness of the stepped portion 119 is around the thickness of the fastened member 2001, and the diameter thereof is a smaller diameter than the seat face 117 on the nut side and a larger diameter than the hole diameter of the nut 1101. Also, a hole diameter of the hole 2001*a* in the fastened member 2001 through which the stepped portion 119 passes is a larger diameter than an outer diameter of the stepped portion 119, and is set to be no greater than an inner diameter of the seal portion 121 of the seal function adding member 120, up to an inner end of the seal portion 121 being in contact with the fastened member 2001. The hole diameter of the hole 2001*a* may be larger in diameter than the inner diameter of the seal portion 121, with part of a region of the inner diameter side of the seal portion 121, around half thereof for example, overlapping on the hole 2001*a*. Also, the hole diameter of a hole 2011*a* of the fixing member 2011 through which a shaft portion 1202*b* of the bolt 1202 passes is smaller in diameter than the outer diameter of the stepped portion 119.

With respect to the seat face 117 on the head portion side, the seat face 117 does not have to be provided, as illustrated in FIG. 12(B). In this case, a flange-side face 117*b* on the shaft portion side of the flange main body is situated on the same plane as the shaft-face-side side face 116*b* of the annular protruding portion 116, in the same way as in the example in FIG. 8 regarding electrical corrosion prevention.

Note that the fastened member 2001 is not limited to CFRP material, and is applicable to material which electrical corrosion advances under no more than moisture in the air.

With material regarding which electrical corrosion does not advance under no more than moisture in the air, the seat face 117 of the nut 1101 may come into contact with the fastened member 2001, as illustrated in FIG. 12(C). In this case as well, axial force is obtained by the seat face 119*a* of the stepped portion 119 being seated to the fixing member 2011. The seat face 117 of the nut 1101 side acts to restrain the fastened member 2001. The present example is effective with regard to fastening members that are soft, for example. At this time, even if creeping occurs due to deterioration over time of the fastened member 2001, the role of restraining by the seal function adding member 120 can be maintained.

Note that in the above Embodiment 2, description has been made by way of an example of a hexagonal nut with a flange, but the present disclosure is not limited to a hexagonal nut, and is applicable to a square nut, a cap nut, a wingnut, or the like. The point is that application can be broadly made to various types of female screw members that have a female screw member main body serving as a fastener main body having a seat face, a screw hole in which a female screw is formed to tighten the seat face of the female screw member main body as to a fastened member, and a flange portion that is provided on the female screw member main body, with a seal function adding member that is annular in shape being mounted to the flange portion.

Other Configuration Examples of Seal Function Adding Members

Also, the seal function adding members 20 and 120 in the above Embodiments 1 and 2 are integrally formed on the annular protruding portions 16 and 116 of the flange portions 14 and 114, but the seal function adding members 20 and 120 may be formed separately from the bolt 1 and the nut 101, so as to be detachably assembled to the bolt 1 and the nut 101.

Figure 5A:
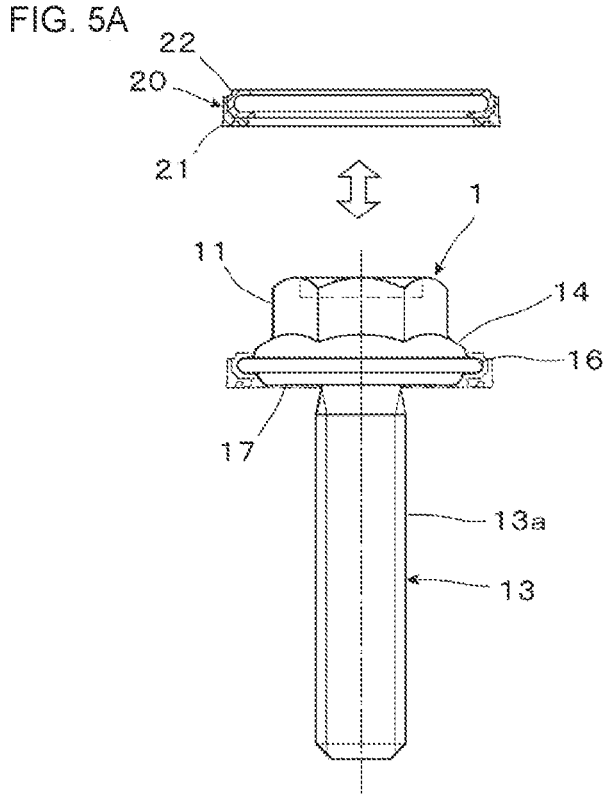
FIG. 5(A) is an explanatory diagram of a case of assembling the seal function adding member to a bolt.
Figure 5B:
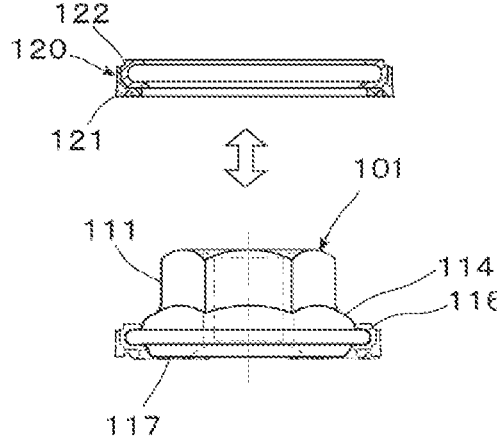
FIG. 5(B) is an explanatory diagram of a case of assembling the seal function adding member to a nut.

FIG. 5(A) illustrates an example of detachably assembling the seal function adding member 20 to the flange portion 14 of the bolt 1, and FIG. 5(B) illustrates an example of detachably assembling the seal function adding member 120 to the flange portion 114 of the nut 101. The configurations of the seal function adding members 20 and 120 are the same in Embodiments 1 and 2, and component portions that are the same are denoted by the same signs.

According to this arrangement, in a case of the service life having elapsed, or the seal function adding members 20 and 120 being damaged, resources can be conserved by replacing the seal function adding members 20 and 120 alone.

About Shape of Seal Portions 21 and 121

Further, no ribs have to be provided on the seal portions 21 and 121 of the seal function adding members 20 and 120 in Embodiments 1 and 2, and the outer circumferential faces to not have to be tapered shapes.

FIG. 13 illustrates various types of modifications of the seal portions 21 and 121.

FIG. 13(A) illustrates an example in which outer circumferential faces 210' and 1210' of the seal portions 21 and 121 are cylindrical faces parallel to the center axial lines N and N1.

FIG. 13(B) illustrates an example in which the outer circumferential faces 210 and 1210 of the seal portions 21 and 121 are tapered shapes spreading outward toward the screw end, but no ribs are provided, and contact faces 21s and 121s of contact with the fastened member 200 are flat faces orthogonal to the center axial lines N and N1. In any case, the outer edge may be an inclined face that protrudes toward the screw end side, in the same way as with the distal end face of the first rib 21c.

In FIG. 13(C), the outer circumferential faces 210' and 1210' of the seal portions 21 and 121 are cylindrical faces parallel to the center axial lines N and N1, in the same way as in FIG. 13(A), and the contact faces 21s and 121s as to the fastened member 200 are flat faces without ribs, in the same way as in FIG. 13(B).

Also, the fitting shapes of the annular protruding portions 16 and 116 and the recessed portions 18 and 118 of the sliding portions 22 and 122 that fit with each other, in Embodiments 1 and 2, are not limited to the cross-sectional shapes described above, and the sliding portions 22 and 122 are rotatably slidable in the circumferential direction as long as the cross-sectional shapes taken along a plane passing through the center axial lines N and N1 are the same shape at any position in the circumferential direction. For example, the head-portion main-body-side side face 16a (tubular-body-side side face 116a) and the shaft-portion-side side face 16b (seat-face-side side face 116b) of the annular protruding portions 16 and 116 with which the first-side-face covering portions 22a and 122a and the second-side-face covering portions 22b and 122b come into contact do not have to be parallel to a plane orthogonal to the center axial lines N and N1. Also, these may be inclined faces inclined by a predetermined angle as to the plane orthogonal to the center axial lines N and N1, may be curved faces, and may be recessed and protruding shapes that engage each other.

FIG. 14 illustrates various types of modifications of the shapes of the annular protruding portions 16 and 116 and the seat faces 17 and 117.

Figures 14A, 14B, 14C, 14D:
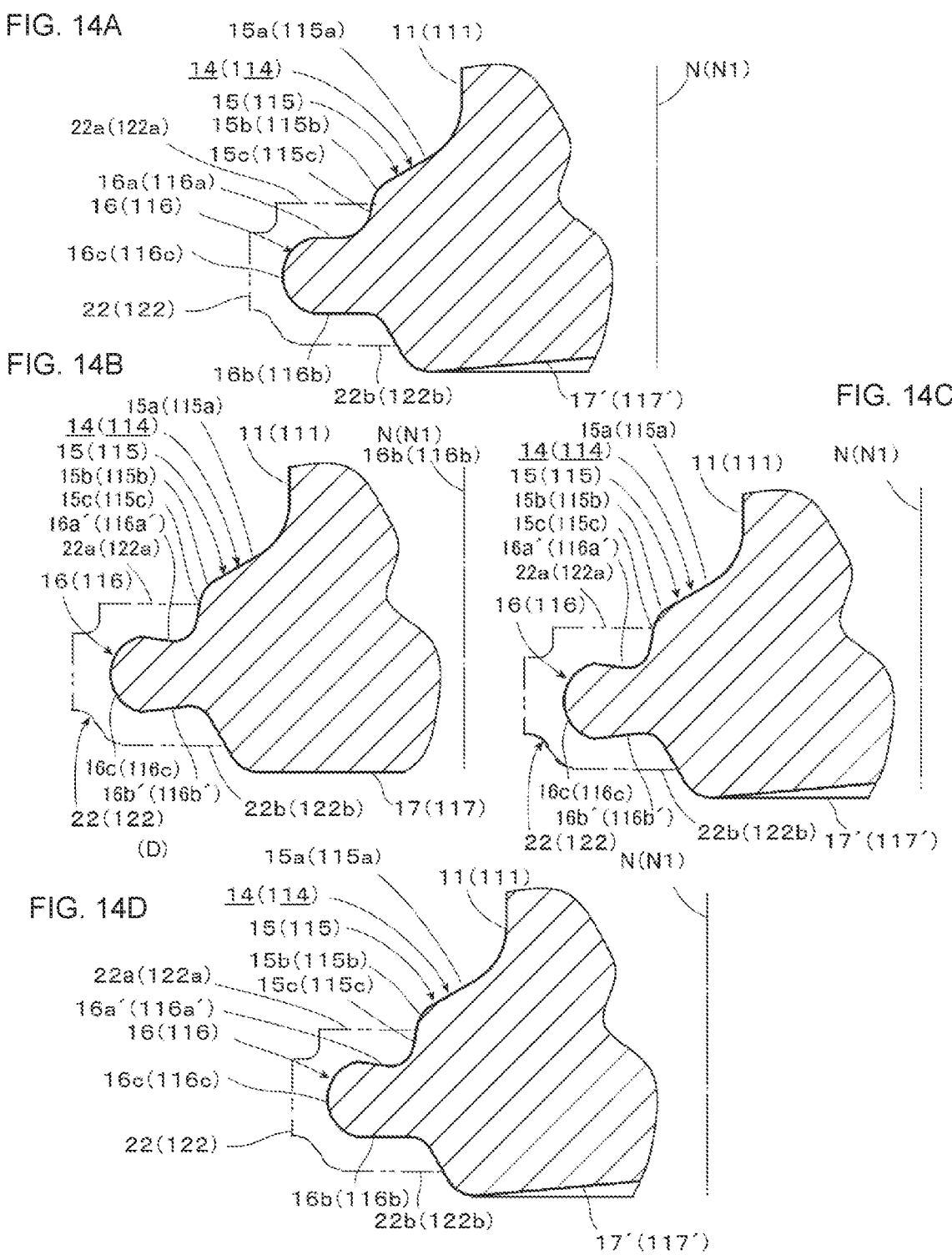
FIG. 14(A) to FIG. 14(D) illustrate various types of modifications of annular protruding portions and seat faces according to Embodiments 1 and 2.

In FIG. 14(A), seat faces 17' and 117' are tapered shapes inclined so as to protrude toward the screw end side, from the center axial line N and N1 side toward the outer edge side. The annular protruding portions 16 and 116 have cross-sectional letter-U shapes in the same way as in Embodiments 1 and 2, with the head-portion main-body-side side face 16a (tubular-body-side: side face 116a) and the shaft-portion-side side face 16b (seat-face-side side face 116b) of the annular protruding portions 16 and 116 with which the sliding portions 22 and 122 come into contact being flat shapes in which the head-portion main-body-side side face 16a (tubular-body-side side face 116a) and the shaft-portion-side side face 16b (seat-face-side side face 116b) are orthogonal as to the center axial lines N and N1.

In FIG. 14(B), the seat faces 17 and 117 are situated on a plane orthogonal to the center axial lines N and N1, and the annular protruding portions 16 and 116 have cross-sectional letter-C shapes. A head-portion main-body-side side face 16a' (tubular-body-side side face 116a') with which the first-side-face covering portions 22a and 122a of the sliding portions 22 and 122 come into contact are tapered shapes inclining toward the screw end side, from the outer diameter side toward the inner diameter side, and a shaft-portion-side side face 16b' (seat-face-side side face 116b') with which the second-side-face covering portions 22b and 122b of the sliding portions 22 and 122 come into contact are tapered shapes inclining toward an opposite direction from the screw end side, from the outer diameter side toward the inner diameter side. The contact faces of the first-side-face covering portions 22a and 122a and the second-side-face covering portions 22b and 122b of the sliding portions 22 and 122 are also tapered shapes, in accordance with the head-portion main-body-side side face 16a' (tubular-body-side side face 116a') and the shaft-portion-side side face 16b' (seat-face-side side face 116b') of the annular protruding portions 16 and 116. Such tapered shapes also yield effects of preventing falling out of the sliding portions 22 and 122, and consequently of the seal function adding members 20 and 120.

In FIG. 14(C), the seat faces 17' and 117' are tapered shapes inclining so as to protrude toward the screw end side, from the center axial line N and N1 side toward the outer edge side, in the same way as in FIG. 14(A), and the annular protruding portions 16 and 116 have cross-sectional letter-C shapes, in the same way as in FIG. 14(B).

In FIG. 14(D), the seat faces 17' and 117' are tapered shapes inclining so as to protrude toward the screw end side, from the center axial line side toward the outer edge side, in the same way as in FIG. 14(A), and with regard to the annular protruding portions 16 and 116, the head-portion main-body-side side face 16a' (tubular-body-side side face 116a') are tapered shapes inclining toward the screw end side, from the outer diameter side toward the inner diameter side, and the shaft-portion-side side face 16b (seat-face-side side face 116b) are flat faces that are orthogonal to the center axial lines N and N1.

With regard to the annular protruding portions 16 and 116, an arrangement may be made in which the shaft-portion-side side face 16b (seat-face-side side face 116b) are tapered shapes inclining toward an opposite side from the screw end side, from the outer diameter side toward the inner diameter side, and the head-portion main-body-side side face 16a (tubular-body-side side face 116a) are flat faces that are orthogonal to the center axial lines N and N1. Also, the seat faces 17 and 117 may be flat faces that are orthogonal to the center axial lines N and N1.

Note that these modifications are exemplary, and not limited to these modifications. For example, the cross-sectional shapes of the outer circumferential faces of the annular protruding portions 16 and 116 and the outer circumference covering portions 22c and 122c of the sliding portions 22 and 122 are not limited to cross-sectional arc shapes, and may be recessed arcs, polygons such as triangles, squares, or the like, recessed and protruding shapes, and so forth, as long as the cross-sectional shapes taken along a plane passing through the center axial lines N and N1 are the same shape at any position in the circumferential direction.

Also, although sliding is performed at the interfaces of the annular protruding portions 16 and 116 of the flange portions 14 and 114 and the sliding portions 22 and 122 in the above Embodiments 1 and 2, a configuration may be made in which the seal portion slides at the interfaces of the sliding portions 22 and 122 and the seal portions 21 and 121. For example, forming the seal portions 21 and 121 to also have cross-sectional letter-C shapes, and to cover the first-side-face covering portions 22a and 122a of the sliding portions 22 and 122, enables sliding to be performed at the interfaces of the sliding portions 22 and 122 and the seal portions 21 and 121, without falling out.

Further, an arrangement in which sliding is performed on at least one of the interfaces of the sliding portions 22 and 122 and the seal portions 21 and 121 and the interfaces of the sliding portions 22 and 122 and the flange portions 14 and 114 enables sliding to be performed at one of the interfaces, and twisting deformation of the seal portions 21 and 121 and the sliding portions 22 and 122 can be minimized.

Also, in the above Embodiments, the seal function adding members 20 and 120 have a two-layer configuration of the seal portions 21 and 121 and the sliding portions 22 and 122, but a three-layer structure may be made in which an adhesive layer is added between the seal portions 21 and 121 and the sliding portions 22 and 122, and further, a sliding portion may be further disposed between the seal portions 21 and 121 and the sliding portions 22 and 122 such that a plurality of layers of sliding portions are disposed, and various types of structures can be applied without departing from the spirit of the present disclosure.

Figures 15A, 15B, 15C:
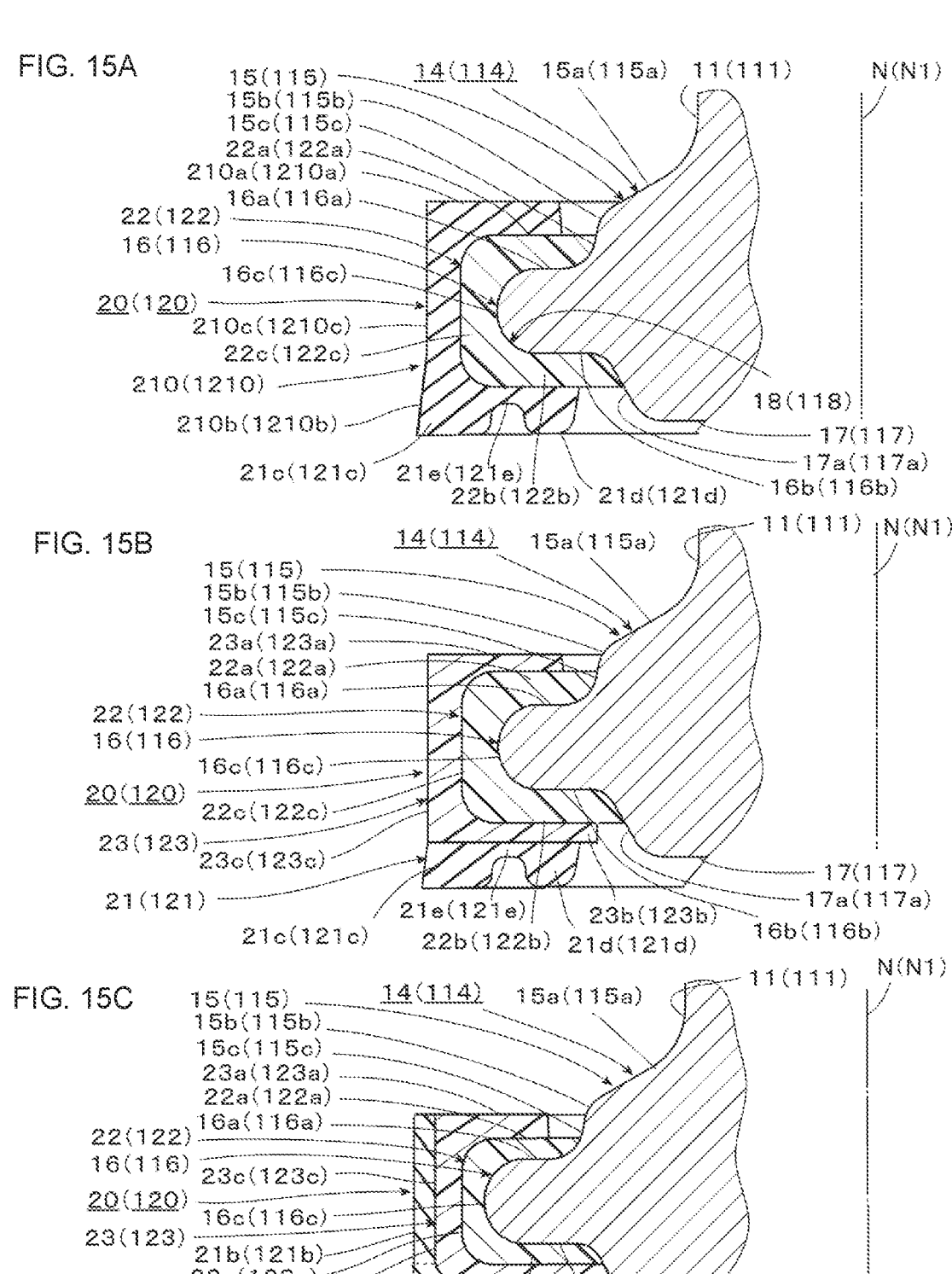
FIG. 15(A) to FIG. 15(C) are partial cross-sectional views illustrating various types of modifications of the seal function adding members according to Embodiments 1 and 2.

FIG. 15(A) illustrates a modification in which the seal portion has a cross-sectional letter-C shape.

That is to say, seal portions 210 and 1210 have outer circumferential engaging portions 210c and 1210c that cover the outer circumference covering portions 22c and 122c of the sliding, first-side-face engaging portions 210a and 1210a that cover the first-side-face covering portions 22a and 122a of the sliding portions 22 and 122, and second-side-face engaging portions 210b and 1210b that cover the second-side-face covering portions 22b and 122b of the sliding portions 22 and 122. The first ribs 21c and 121c, and the second ribs 21d and 121d are provided on the second-side-face engaging portions 210b and 1210b.

The cross-sectional shapes of the seal portions 210 and 1210, the sliding portions 22 and 122, and the annular protruding portions 16 and 116, that fit to each other, taken along a plane passing through the center axial lines N and N1, are the same shapes regardless of the phase in the circumferential direction where the cross-section is taken, and are capable of relative rotational sliding in the circumferential direction.

For example, making the outer circumferential shape of the annular protruding portions 16 and 116 to be non-circular, rotation of the sliding portions 22 and 122 is restricted, and sliding can be performed at the interfaces of the sliding portions 22 and 122 and the seal portions 210 and 1210. In any case, both of the interfaces of the annular protruding portions 16 and 116 and the sliding portions 22 and 122, and the interfaces of the sliding portions 22 and 122 and the seal portions 210 and 1210, may be slidable. The point is that it is sufficient for sliding to be capable on at least one interface of the interfaces of the annular protruding portions 16 and 116 and the sliding portions 22 and 122, and the interfaces of the sliding portions 22 and 122 and the seal portions 210 and 1210.

Corner portions of the outer circumference covering portions 22c and 122c and the first-side-face covering portions 22a and 122a of the sliding portions 22 and 122, and corner portions of the outer circumference covering portions 22c and 122c and the second-side-face covering portions 22b and 122b may be curved shapes, or may be chamfered.

FIG. 15(B) illustrates an example in which the seal portions 21 and 121 are rotationally slidably provided as to the sliding portions 22 and 122 via intermediate sliding portions 23 and 123, with the sliding portions 22 and 122 and the intermediate sliding portions 23 and 123 formed by two-shot molding, such that the seal portions 21 and 121 are adhered and fixed to the intermediate sliding portions 23 and 123. This is effective in a case of the seal portions 21 and 121 being of a material that does not lend itself to injection molding, such as Si rubber or the like.

The intermediate sliding portions 23 and 123 have cross-sectional letter-C shapes and include outer circumferential engaging portions 23c and 123c that cover the outer circumference covering portions 22c and 122c of the sliding portions 22 and 122, first-side-face engaging portions 23a and 123a that cover the first-side-face covering portions 22a and 122a of the sliding portion 22, and second-side-face engaging portions 23b and 123b that cover the second-side-face covering portions 22b and 122b of the sliding portion 22. The seal portions 21 and 121 having the first ribs 21c and 121c and the second ribs 21d and 121d are applied to the second-side-face engaging portions 23b and 123b. The sliding portions 22 and 122, the intermediate sliding portions 23 and 123, and the seal portions 21 and 121 may be formed by three-shot molding. In a case of three-shot molding, the interfaces of the second-side-face engaging portions 23b and 123b and the seal portions 21 and 121 are cohesive faces.

FIG. 15(C) is an example in which the seal portions 21 and 121 are rotationally slidably fit as to the sliding portions 22 and 122 via the intermediate sliding portions 23 and 123, in the same way as in FIG. 15(B), but the sliding portions 22 and 122, the intermediate sliding portions 23 and 123, and the seal portions 21 and 121, are formed by three-shot molding.

The portions that slide are the interfaces of the intermediate sliding portions 23 and 123 and the sliding portions 22 and 122, or the interfaces of the sliding portions 22 and 122 and the annular protruding portions 16 and 116, while the interfaces of the seal portions 21 and 121 and the intermediate sliding portions 23 and 123 cohere and do not slide.

The seal portions 21 and 121 include seal main bodies 121a that are annular and that are joined to the second-side-face engaging portions 23b and 123b of the intermediate sliding portions 23 and 123, and the engaging portions 21b and 121b that extend from the seal main bodies 21a and 121a to the outer circumferential engaging portions 23c and 123c, and engage grooves 23f and 123f formed on the outer circumference of the outer circumferential engaging portions 23c and 123c.

Also, while the bolt 1 and the nut 101 described above are made of a metal having electroconductivity, with the seal function adding members 20 and 120 functioning as insulators, if a bolt 301 and the nut 101 are made of a material that does not have electroconductivity, or are subjected to surface treatment such as rustproofing or the like, insulating functions do not have to be provided.

Embodiment 3

Next, Embodiment 3 of the present disclosure will be described.

FIG. 6 illustrates a screwing fastener according to Embodiment 3 of the present disclosure. This Embodiment 3 is an application of the present disclosure to a bolt, which is an example of a male screw member.

Figures 6A, 6B, 6C, 6D:
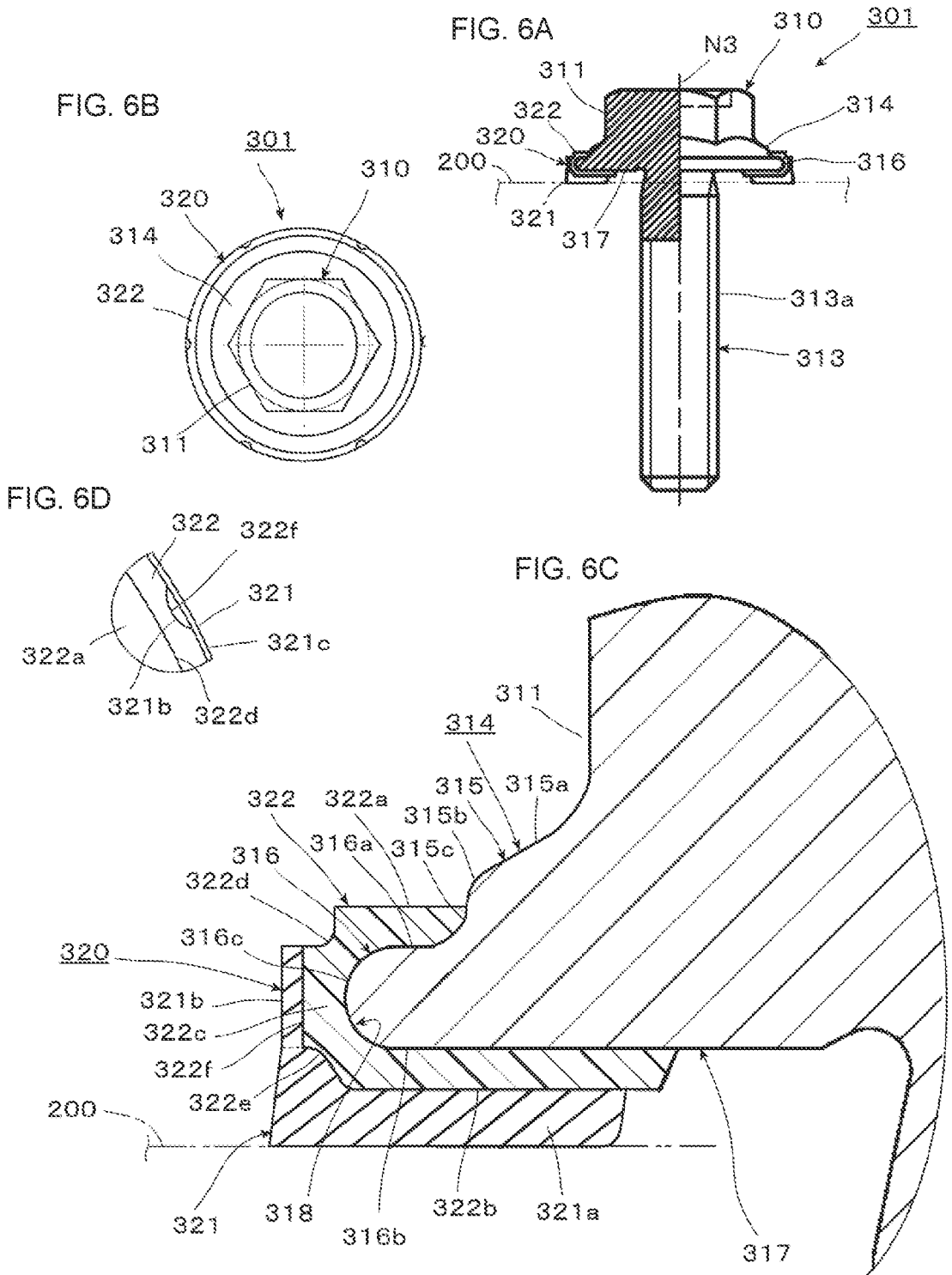
FIG. 6(A) is a frontal view, illustrating an insulation function adding member in cross-sectional view.
FIG. 6(B) is a top view of a head portion side.
FIG. 6(C) is a partial enlarged view of a seal portion attaching portion in FIG. 6(A)
FIG. 6(D) is an enlarged cross-sectional view of a spin stopper for a seal portion and a sliding portion.

First, an overall configuration will be described with reference to FIG. 6(A) and FIG. 6(B). FIG. 6(A) is a frontal view, illustrating a function adding member of a bolt in cross-sectional view, and FIG. 6(B) is a top view of a head portion side of the bolt.

In the figures, 301 indicates an entire bolt serving as a screwing fastener. This bolt 301 is provided with a head portion 310 that serves as a fastener main body, and a shaft portion 313 on which is formed a male thread 313a that tightens the head portion 310 against the fastened member 200. A flange portion 314 is provided to the head portion 310, and an insulation function adding member 320 that is annular in shape is mounted to the flange portion 314 as a function adding member, configured such that the insulation function adding member 320 comes into close contact with the fastened member 200 when tightening, thereby electrically insulating the head portion 310 and the fastened member 200. Also, functions of sealing off fluids may be imparted. Fluids that are sealed off include liquids such as water and so forth, and gasses such as air and so forth.

The insulation function adding member 320 has at least a two-layer structure, of a sliding portion 322 serving as a first adding portion that comes into contact with the flange portion 314, and an insulating portion 321 serving as a second adding portion that comes into contact with the fastened member 200. The head portion 310 including the flange portion 314, and the shaft portion 313, are made of metal that is electroconductive.

The head portion 310 has a head portion main body 311 that has a shape of a hexagonal post, for transmitting torque from a tightening tool, and the flange portion 314 that has a shape of a cone that extends outward with a larger diameter than a diagonal distance of the head portion main body 311, and a flange side face 317 on the opposite side of the head portion main body 311 from the flange portion 314 is a flat face that faces the fastened member 200. Unlike in Embodiment 1, this flange side face 317 is not a seat face, and is not seated on the fastened member 200 when fastening. This flange side face 317 is situated on a plane that is orthogonal to a center axial line N3 of the shaft portion 13. In this Embodiment 3, the insulation function adding member 320 is what comes into contact with the fastened member 200 when fastening.

Next, a configuration of the insulation function adding member and an attaching portion of the insulation function adding member will be described in detail with reference to FIG. 6(C). FIG. 6(C) is a partial enlarged cross-sectional view of the attaching portion of the insulation function adding member.

The flange portion 314 is provided with a flange main body 315 that is thick and that extends outward in a truncated cone shape, and an annular protruding portion 316 and that is thin and that protrudes outward from an outer circumference of the flange main body 315. A side face of the flange portion 314 on the shaft portion side is one flat flange side face 317 that is orthogonal to the center axial line N3, and there is no seat face 17 that protrudes further out from the shaft-portion-side side face 16b of the annular protruding portion 16 toward the screw end, as in Embodiment 1 illustrated in FIG. 1. A shaft-portion-side side face 316b of the annular protruding portion 316 according to the present Embodiment 3 is situated on the same plane as the flange side face 317.

Also, a head-portion main-body-side side face 316a of the annular protruding portion 316 is on a plane that is orthogonal to the center axial line N3, and an outer circumferential face 316c of the annular protruding portion 316 is a cross-sectional arc shape (cross-section taken along a plane passing through the center axial line N3) projecting outward.

A side face of the flange main body 315 on the head portion main body 311 side is a first inclined face 315a that is inclined in a direction gradually increasing in diameter toward the shaft portion 313 side, and a step wall 315c of a predetermined height is provided between this first inclined face 315a and the head-portion main-body-side side face 316a of the annular protruding portion 316. A corner portion 315b of the step wall 315c and the first inclined face 315a is a projecting rounded shape, and an inner corner portion of the step wall 315c and the head-portion main-body-side side face 316a of the annular protruding portion 316 has a recessed curved-face shape.

Next, the insulation function adding member 320 will be described.

The sliding portion 322 of the insulation function adding member 320 is an annular member with a cross-sectional letter-C shape, having a recessed portion 318 that fits with the annular protruding portion 316, and has an outer circumference covering portion 322c that covers the outer circumferential face 316c of the annular protruding portion 316, a first-side-face covering portion 322a that extends inward from one end of the outer circumference covering portion 322c and covers the head-portion main-body-side side face 316a of the annular protruding portion 316, and a second-side-face covering portion 322b that extends inward from another end of the outer circumference covering portion 322c and covers the flange side face 317.

The cross-sectional shape of the recessed portion 318 of the sliding portion 322 matches the cross-sectional shape of the annular protruding portion 316, and the sliding portion 322 is capable of sliding in the rotational direction at an interface with the annular protruding portion 316. An inner circumferential face of the outer circumference covering portion 322c is a cross-sectional arc shape that is modeled after the outer circumferential face 316c of the annular protruding portion 316, inner side faces of the first-side-face covering portion 322a and the second-side-face covering portion 322b are annular flat faces modeled after the head-portion main-body-side side face 316a of the annular protruding portion 316 and the flange side face 317, and an inner circumference of the sliding portion 322 smoothly slides in a state of being in contact with the entire circumference of the annular protruding portion 316.

Also, to describe an outer circumferential shape of the sliding portion 322, the outer circumferential face of the outer circumference covering portion 322c is a cylindrical face, and outer circumferential faces of the first-side-face covering portion 322a and the second-side-face covering portion 322b are faces orthogonal to the center axial line N3. A first notch 322d that is a recessed curved face shape is provided at a corner portion of the outer circumferential face of the outer circumference covering portion 322c and the outer circumferential face of the first-side-face covering portion 322a. Also, a second notch 322e that is a recessed curved face shape is provided at a corner portion of the outer circumferential face of the outer circumference covering portion 322c and the second-side-face covering portion 322b, as well. An angle portion between this second notch 22e and the second-side-face covering portion 322b is a protruding curved face shape.

The outer circumferential shape of this sliding portion 322 does not serve as a sliding face, and accordingly, the cross-sectional shape orthogonal to the center axial line N3 may be, for example, a polygonal shape such as square, triangular, or the like, or may be a recessed and protruding shape with serrations provided on the outer circumference, and various types of shapes can be selected.

The height of an outer side face of the first-side-face covering portion 322a is set to a position that is lower than the corner portion 315b of the first inclined face 315a and the step wall 315c, and the size of the step between the first-side-face covering portion 322a and the corner portion 315b prevents the sliding portion 322 from interfering with a tool such as a socket or the like. Also, an end portion of the first-side-face covering portion 322a is a curved face shape modeled after the curved face shape of the inner corner portion of the head-portion main-body-side side face 316a of the annular protruding portion 316 and the step wall 315c, and is in close contact with the inner corner portion.

An outer side face of the second-side-face covering portion 322b protrudes toward the screw end side with respect to the flange side face 317. Also, an inner diameter of the second-side-face covering portion 322b is smaller in diameter than the first-side-face covering portion 322a.

The insulating portion 321 is provided with an insulating portion main body 321a that is annular and that joins the second-side-face covering portion 322b of the sliding portion 322, and an engaging portion 321b that extends from the insulating portion main body 321a to the outer circumference covering portion 322c side, and engages a groove 322f formed on an outer circumference of the outer circumference covering portion 322c. In this Embodiment, the joining portion of the second-side-face covering portion 322b and the insulating portion 321 is a cohesion layer where the two cohere to each other.

The insulating portion main body 321a has a flat and annular shape, and the contact face with the fastened member 200 is a flat face with no unevenness such as ribs, that comes into full face contact with the fastened member 200. In the illustrated example, an inner diameter of the insulating portion main body 321a is slightly larger in diameter than the inner diameter of the second-side-face covering portion 322b of the sliding portion 322, but may be the same diameter. Note that the insulating portion main body 321a does not need to be a flat face, and may be an uneven face that has ribs or the like.

Also, an outer circumferential face of the insulating portion main body 321a has gradient in a direction of gradually increasing in diameter toward the screw end side, with respect to the cylindrical face that is orthogonal to the flange side face 317. Also, a corner portion of an outer edge of a distal end face of the insulating portion main body 321a is an acute angle, and a corner portion of an inner edge is rounded. The corner portion on the outer edge of the distal end face of the insulating portion main body 321a may also be rounded or tapered.

The engaging portion 321b of the insulating portion 321 is equidistantly disposed at a plurality of locations in the circumferential direction, six locations in the illustrated example, functioning as spin stoppers that restrict relative rotation of the insulating portion 321 and the sliding portion 322. The groove 322f formed on the outer circumferential face of the outer circumference covering portion 322c is arc-shaped as illustrated in FIG. 6(D), and the inner circumferential shape of the engaging portion 321b is also formed arc-shaped, modeled after the groove 322f, with the outer circumferential shape being formed arc-shaped modeled after the cylindrical outer circumferential face of the outer circumference covering portion 322c of the sliding portion 322.

The insulating portion 321 described above is a sealing material that is in close contact with the surface of the fastened member 200 and forms a seat face, and accordingly is preferably made of a material that has rubber-like elasticity in order to obtain frictional force when tightening. Thus, having rubber-like elasticity means that not only insulating functions but sealing functions can also be imparted. Seal materials described in Embodiment 1 can be used as materials for the insulating portion 321. Examples of materials to be used for the insulating portion 321 include common rubber materials such as nitrile rubber, silicone rubber, urethane rubber, and so forth, resin materials such as fluororesin, polyethylene, and so forth, thermoplastic elastomer, and so forth. These seal materials have a high specific resistivity, and can be used as electrical insulators.

Also, the sliding portion 322 is a portion that functions to slide over the contact face of the flange portion 314 and the annular protruding portion 316, by the friction acting on the insulating portion 321 when tightening. Various types of resin materials having self-lubricating properties can be used as materials for the sliding portion 322, including PTFE (polytetrafluoroethylene) polyamide (PA) polyacetal (POM), elastomers, and further thermosetting resins and so forth.

For example, in a case of using thermoplastic elastomer or the like as the material of the insulating portion 321 and the sliding portion 322, the insulating portion 321 is preferably imparted with elasticity by setting the hardness thereof to be low, and the sliding portion 322 is preferably imparted with slidability by setting the hardness thereof to be high, and thus used.

In the present embodiment, the insulating portion 321 and the sliding portion 322 are formed by insertion molding, although not illustrated in particular. That is to say, the sliding portion 322 of the insulation function adding member 320 is first formed on the annular protruding portion 316 of the flange portion 314 of the bolt 301 by insertion molding. Thereafter, the insulating portion 321 is formed by insertion molding on an intermediate body of the bolt on which the sliding portion 322 was formed. Thus, no process of assembling the insulation function adding member 320 is necessary, and manufacturing is facilitated. A surface of the annular protruding portion 316 of the flange portion 314 is a smooth face, and the sliding portion 322 that is formed is rotatably slidable without being adhered.

Note that the insulating portion 321 is not limited to such an insertion molded article, and may be applied to the sliding portion 322 using double-sided tape, adhesive agent, or the like, in a case of a material that does not lend itself to injection molding, such as Si rubber or the like, for example.

Next, operations of the bolt according to the present embodiment will be described by way of an example of a fastening structure for fixing a welding member fixing jig of a resistance welder.

First, a reference example of a fastening structure for fixing a welding member fixing jig of a resistance welder will be described with reference to FIG. 7(A) and FIG. 7(B).

Figures 7A, 7B, 7C:
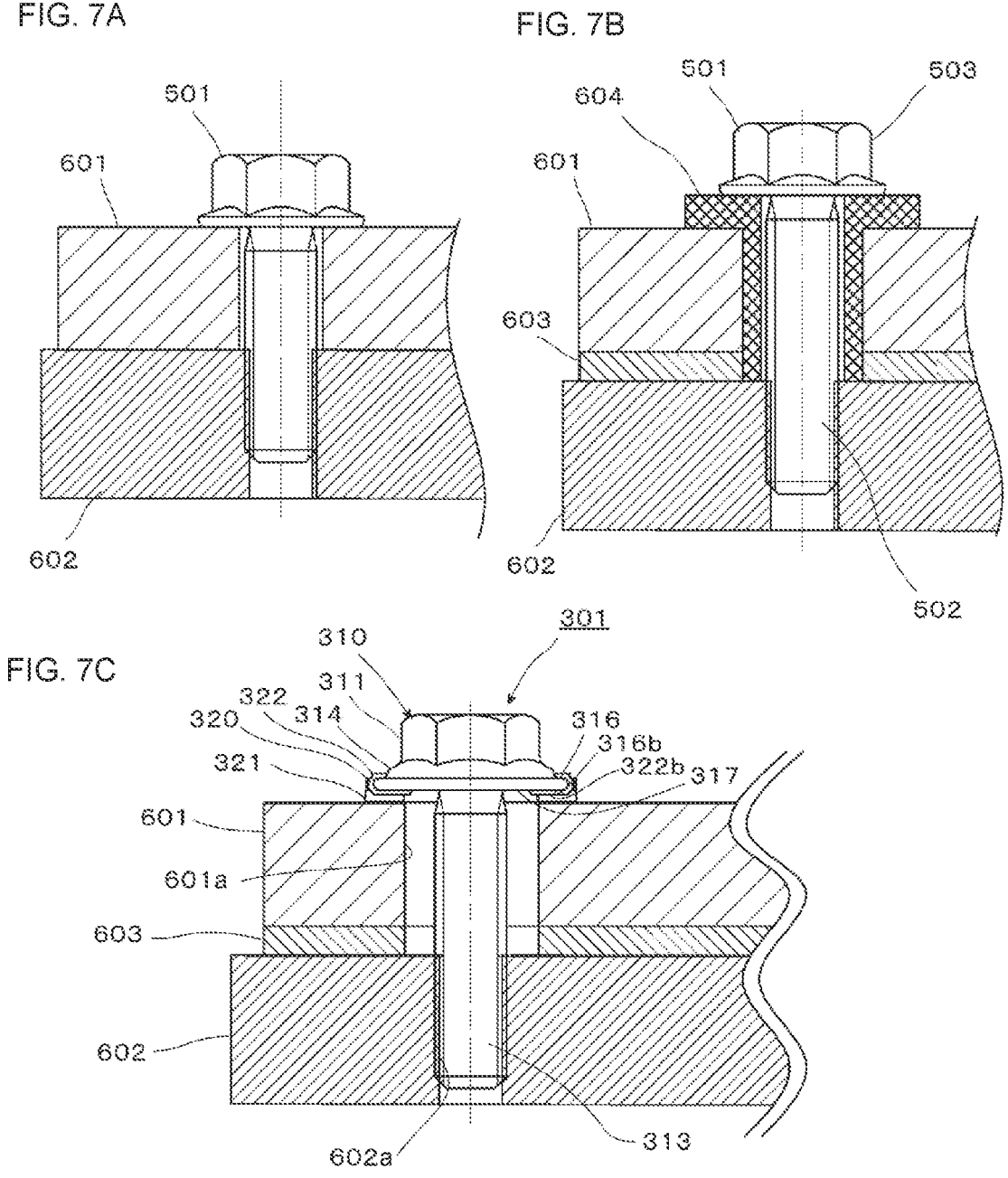
FIG. 7(A) and FIG. 7(B) are reference examples of a fastening structures of a welding member fixing jig of a resistance welder using a bolt.
FIG. 7(C) is a configuration example of a fastening structure using the bolt with the insulation function adding member according to the present Embodiment 3.

As illustrated in FIG. 7(A), when welding using a resistance welder, a welding member fixing jig 601 is used to fix a welding member that is omitted from illustration. This welding member fixing jig 601 is fixed to a substrate 602 by a bolt 501. When welding is performed in this state, electric current flows between the welding member fixing jig 601 and the bolt 501, or between the substrate 602 and the welding member fixing jig 601, which may become welded due to Joule heat. When the welding member fixing jig 601 and the bolt 501 become welded, the welding member fixing jig 601 can no longer be detached.

Accordingly, it is conceivable to interpose a resin insulator 603 such as Bakelite or the like between the substrate 602 and the welding member fixing jig 601, as illustrated in FIG. 7(B), and further assemble a flanged collar 604 that has insulating properties, and that is made of Bakelite or the like, between the welding member fixing jig 601 and the bolt 501 as well, and perform welding with insulation thus performed. The flanged collar 604 is for insulating between a bolt head portion 503 and the welding member fixing jig 601, and further between a shaft portion 502 of the bolt and the welding member fixing jig 601.

However, assembling such a flanged collar 604 that has insulating properties leads to an additional part of the flanged collar 604, and also increased size of the welding member fixing jig 601 and the resin insulator 603 due to this addition, increasing costs. This also leads to poorer work efficiency at the time of detaching the welding member fixing jig 601, as well.

FIG. 7(C) is a configuration example of a fastening structure using the bolt 301 with the insulation function adding member according to Embodiment 3.

That is to say, the insulator 603 such as Bakelite is interposed between the welding member fixing jig 601 serving as the fastened member and the substrate 602, in the same way as in FIG. 7(B), thereby insulating between the welding member fixing jig 601 and the substrate 602.

The shaft portion 313 of the bolt 301 is then passed through a hole 601a in the welding member fixing jig (fastened member) 601 and a hole 603a in the insulator 603, and screwed into a screw hole 602a provided on the substrate 602 so as to be tightened and fixed.

Between the welding member fixing jig 601 and the head portion 310 of the bolt 301 is insulated by the insulation function adding member 320. Accordingly, the flanged collar 604 such as described in the reference example becomes unnecessary, so reduction in costs can be realized, and also conservation of space and improved work efficiency of removing the welding member fixing jig 601 can be realized.

At the time of tightening the head portion 310 in the present Embodiment 3, first, the insulating portion 321 is seated on the welding member fixing jig 601. At this time, the flange side face 317 is not seated. As tightening processes, the frictional force of the insulating portion 321 in contact with the welding member fixing jig 601 increases, and the interface at the contact portion between the sliding portion 322 and the annular protruding portion 316 where frictional force is relatively small slides. Accordingly, excessing twisting does not occur in the insulating portion 321 making up the insulation function adding member 320, and peeling and so forth of the insulating portion 321 can be prevented.

Fastening is completed in a non-contact state in which the flange side face 317 of the flange portion 314 is not seated on the welding member fixing jig 601, and the head portion 310 of the bolt 301 and the welding member fixing jig 601 are maintained in an insulated state.

The axial force at the time of fastening is dependent on compression reactive force of the insulating portion 321 of the insulation function adding member 320 and the sliding portion 322, and fastening is performed with a relatively weak force for the tightening force.

The insulating portion 321 and the sliding portion 322 are formed of resin or a rubber-like elastic material, which exhibits deterioration at an early stage, but the bolt 301 is for temporary attachment, and is removed after welding, so deterioration is not problematic.

Also, the contact surface pressure at the contact portion between the sliding portion 322 and the annular protruding portion 316, i.e., the contact surface pressure at the interface of the shaft-portion-side side face 316b of the annular protruding portion 316 and the second-side-face covering portion 322b of the sliding portion 322 increases so as to be in close contact without space therebetween, and fluids such as water, air, or the like can be sealed off.

Note that as a portion for transmitting torque from a tool to the head portion main body 311, an outer periphery of the head portion main body 311 is a hexagonal head in the present embodiment, but may be special shapes such as a square shape, a hexalobular shape, or the like. Also, instead of transmitting torque from the outer periphery of the head portion main body 311, a configuration may be made where a bit hole such as a cruciform hole, a hexagonal hole, hexalobular hole, a square hole, or the like, is formed at a top face of the head portion main body 311 as a portion for transmitting torque. In this case, the present disclosure is applicable regarding various types of head portion shapes of the head portion main body 311, such as a hemispherical-shaped round head, a fillister head, a pan head, and so forth.

Also, while description has been made by way of an example of a bolt, application can be made to tapping screws and so forth as well, the point being that application can be broadly made to various types of male screw members that have a head portion as a fastener main body, a shaft portion on which a male screw is formed to tighten the head portion as to the fastened member 200, and a flange portion that is provided on the head portion, with an insulation function member that is annular in shape being mounted to the flange portion.

Embodiment 4

Next, Embodiment 4 of the present disclosure will be described.

FIG. 8 illustrates a screwing fastener according to Embodiment 4 of the present disclosure. This Embodiment 4 is an application of the present disclosure to a nut, which is an example of a female screw member.

Figures 8A, 8B, 8C, 8D, 8E:
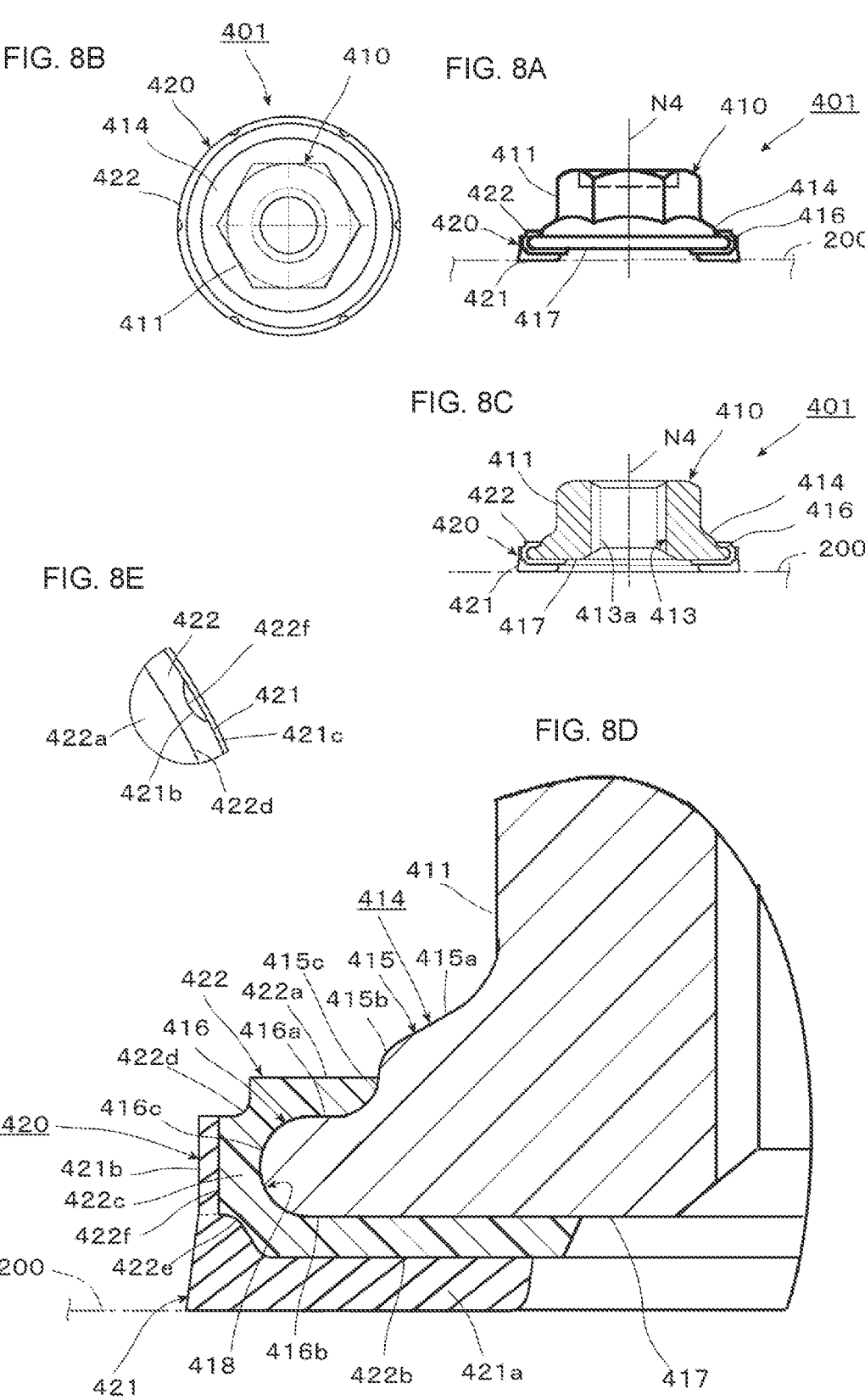
FIG. 8(A) is a frontal view, illustrating an insulation function adding member in cross-sectional view.
FIG. 8(B) is a top view of a side opposite to a seat.
FIG. 8(C) is a cross-sectional view of FIG. 8(A)
FIG. 8(D) is a principal-portion enlarged cross-sectional view of an attaching portion of the insulation function adding member in FIG. 8(A)
FIG. 8(E) is an enlarged cross-sectional view of a proximity of an engaging portion of an insulation portion.

First, an overall configuration will be described with reference to FIG. 8(A) to FIG. 8(C). FIG. 8(A) is a frontal view, illustrating a function adding member of the nut in cross-sectional view, FIG. 8(B) is a top view of a side opposite to a seat of the nut, a top view of the head portion side of the bolt, and FIG. 8(C) is a longitudinal-sectional view of the nut in FIG. 8(A).

In the figures, 401 indicates an entire nut serving as a screwing fastener. This nut 401 is provided with a nut main body 410, and a screw hole 413 in which is formed a female thread 413a that tightens the nut main body 410 against the fastened member 200. A flange portion 414 is provided to the nut main body 410, and an insulation function adding member 420 that is annular in shape is mounted to this flange portion 414, configured such that the insulation function adding member 420 comes into close contact with the fastened member 200 when tightening, thereby electrically insulating between the nut main body 410 and the fastened member 200. Also, functions of sealing off fluids may be imparted. Fluids that are sealed off include liquids such as water and so forth, and gasses such as air and so forth.

In this Embodiment 4, the nut main body 410 is the fastener main body according to the present disclosure, corresponding to a female screw main body, and the screw hole 413 corresponds to a screw portion. The insulation function adding member 420 has at least a two-layer structure, of a sliding portion 422 serving as a first adding portion that comes into contact with the flange portion 414, and an insulating portion 421 serving as a second adding portion that comes into contact with the fastened member 200. The nut main body 410 including the flange portion 414 is made of metal that is electroconductive.

The nut main body 410 has a tubular body 411 that has a shape of a hexagonal tube, for transmitting torque from a tightening tool, and the flange portion 414 that has a shape of a cone that extends outward with a larger diameter than a diagonal distance of the tubular body 411, and a flange side face 417 on the opposite side of the tubular body 411 from the flange portion 414 is a flat face that faces the fastened member 200. Unlike in Embodiment 2, this flange side face 417 is not a seat face, and is not seated on the fastened member 200 when fastening. This flange side face 417 is situated on a plane that is orthogonal to a center axial line N4. In this Embodiment 4, the insulation function adding member 420 is what comes into contact with the fastened member 200 when fastening.

Next, a configuration of the insulation function adding member and an attaching portion of the insulation function member will be described in detail with reference to FIG. 8(D). FIG. 8(D) is a partial enlarged cross-sectional view of the attaching portion of the insulation function adding member.

The flange portion 414 is provided with a flange main body 415 that extends outward in a truncated cone shape and that is thick, and an annular protruding portion 416 that protrudes outward from an outer circumference of the flange main body 415. The side face of the flange portion 414 on the opposite side from the tubular body 411 is one flat flange side face 417 that is orthogonal to the center axial line N4, and there is no seat face 117 that protrudes further out to the opposite side from the tubular body 411, as in Embodiment 2 illustrated in FIG. 3. A seat-face-side side face 416b of the annular protruding portion 416 is situated on the same plane as the flange side face 417 according to Embodiment 4.

Also, a tubular-body-side side face 416a of the annular protruding portion 416 is on a face that is orthogonal to the center axial line N4, and an outer circumferential face 416c is a cross-sectional arc shape (cross-section taken along a plane passing through the center axial line N4) projecting outward.

A side face of the flange main body 415 on the tubular body 411 side is a first inclined face 415a that is inclined in a direction gradually increasing in diameter toward the seat face 417 side, and a step wall 415c of a predetermined height is provided between this first inclined face 415a and the tubular-body-side side face 416a of the annular protruding portion 416. A corner portion 415b of the step wall 415c and the first inclined face 415a is a projecting curved-face shape, and an inner corner portion of the step wall 415c and the tubular-body-side side face 416a of the annular protruding portion 416 is a recessed curved-face shape.

Next, the insulation function adding member 420 will be described.

The sliding portion 422 of the insulation function adding member 420 is an annular member with a cross-sectional letter-C shape, having a recessed portion 418 that fits with the annular protruding portion 416, and has an outer circumference covering portion 422c that covers the outer circumferential face 416c of the annular protruding portion 416, a first-side-face covering portion 422a that extends inward from one end of the outer circumference covering portion 422c and covers the tubular-body-side side face 416a of the annular protruding portion 416, and a second-side-face covering portion 422b that extends inward from another end of the outer circumference covering portion 422c and comes into contact with the seat face 417.

An inner circumferential shape of the recessed portion 418 of the sliding portion 422 matches a cross-sectional shape of the annular protruding portion 416, and the sliding portion 422 is capable of sliding in the rotational direction at an interface with the annular protruding portion 416. That is to say, an inner circumferential face of the outer circumference covering portion 422c is a cross-sectional arc shape that is modeled after the outer circumferential face 416c of the annular protruding portion 416, inner side faces of the first-side-face covering portion 422a and the second-side-face covering portion 422b are flat faces modeled after the tubular-body-side side face 416a of the annular protruding portion 416 and the seat face 417, and an inner circumference of the sliding portion 422 smoothly slides in a state of being in contact with the entire circumference of the annular protruding portion 416.

Also, to describe an outer circumferential shape of the sliding portion 422, an outer circumferential face of the outer circumference covering portion 422c is a cylindrical face, and outer circumferential faces of the first-side-face covering portion 422a and the second-side-face covering portion 422b are faces that are orthogonal to the center axial line N4. A first notch 422d that is a recessed curved face shape is provided at a corner portion of the outer circumferential face of the outer circumference covering portion 422c and the outer circumferential face of the first-side-face covering portion 422a. Also, a second notch 422e that is a recessed curved face shape is provided at a corner portion of the outer circumferential face of the outer circumference covering portion 422c and the second-side-face covering portion 422b, as well. An angle portion between this second notch 422e and the second-side-face covering portion 422b is a protruding curved face shape.

The outer circumferential shape of this sliding portion 422 does not serve as a sliding face, and accordingly, the cross-sectional shape orthogonal to the center axial line N4 may be, for example, a polygonal shape such as square, triangular, or the like, or may be a recessed and protruding shape with serrations provided on the outer circumference, and various types of shapes can be selected.

An outer side face of the first-side-face covering portion 422a is set to a position that is lower than the corner portion 415b of the first inclined face 415a and the step wall 415c, and the size of the step between the first-side-face covering portion 422a and the corner portion 415b prevents the sliding portion 422 from interfering with a tool such as a socket or the like. Also, an end portion of the first-side-face covering portion 422a is a curved face shape modeled after the curved face shape of the inner corner portion of the tubular-body-side side face 416a of the annular protruding portion 416 and the step wall 415c, and is in close contact with the inner corner portion.

An outer side face of the second-side-face covering portion 422b protrudes to the opposite side from the tubular body 411 with respect to the flange side face 417. Also, the inner diameter of the second-side-face covering portion 422b is smaller in diameter than that of the first-side-face covering portion 422a.

The insulating portion 421 is provided with an insulating portion main body 421a that is annular and that joins the second-side-face covering portion 422b of the sliding portion 422, and an engaging portion 421b that extends from the insulating portion main body 421a to the outer circumference covering portion 422c side, and engages a groove 422f formed on an outer circumference of the outer circumference covering portion 422c. In this Embodiment, the joining portion of the second-side-face covering portion 422*b* and the insulating portion 421 is a cohesion layer where the two cohere to each other.

The insulating portion main body 421*a* has a flat and annular shape, and the contact face with the fastened member 200 is a flat face with no unevenness such as ribs or the like, and comes into full face contact with the fastened member 200. In the illustrated example, the inner diameter of the insulating portion main body 421*a* is slightly larger in diameter than the inner diameter of the second-side-face covering portion 422*b* of the sliding portion 422, but may be the same diameter. Note that the insulating portion main body 421*a* does not need to be a flat face, and may be an uneven face that has ribs or the like.

Also, an outer circumferential face of the insulating portion main body 421*a* has a gradient in a direction of gradually increasing in diameter in a direction protruding from the flange side face 417, with respect to the cylindrical face that is orthogonal to the flange side face 417. Also, a corner portion of an outer edge of a distal end face of the insulating portion main body 421*a* is an acute angle, and a corner portion of an inner edge is rounded. The corner portion on the outer edge of the distal end face of the insulating portion main body 421*a* may also be rounded or tapered.

The engaging portion 421*b* of the insulating portion 421 is equidistantly disposed at a plurality of locations in the circumferential direction, six locations in the illustrated example, functioning as spin stoppers that restrict relative rotation of the insulating portion 421 and the sliding portion 422. The groove 422*f* formed on the outer circumferential face of the outer circumference covering portion 422*c* is arc-shaped as illustrated in FIG. 8(D), and an inner circumferential shape of the engaging portion 421*b* is also formed arc-shaped, modeled after the groove 422*f,* with the outer circumferential shape being formed arc-shaped, modeled after the cylindrical outer circumferential face of the outer circumference covering portion 422*c* of the sliding portion 422.

Note that the materials of the insulating portion 421 and the sliding portion 422 are exactly the same as the sliding portion 322 and the insulating portion 321 in Embodiment 3, and accordingly description will be omitted.

In the present embodiment, the insulating portion 421 and the sliding portion 422 are formed by insertion molding, although not illustrated in particular. That is to say, the sliding portion 422 of the insulation function adding member 420 is first formed on the annular protruding portion 416 of the flange portion 414 of the nut 401 by insertion molding. Thereafter, the insulating portion 421 is formed by insertion molding on an intermediate body of the nut on which the sliding portion 422 was formed. Thus, no process of assembling the insulation function adding member 420 is necessary, and manufacturing is facilitated.

A surface of the annular protruding portion 416 of the flange portion 414 is a smooth face, and the sliding portion 422 that is formed is rotatably slidable without being adhered.

Note that the insulating portion 421 is not limited to such an insertion molded article, and may be applied to the sliding portion 322 using double-sided tape, adhesive agent, or the like, in a case of a material that does not lend itself to injection molding, such as Si rubber or the like, for example.

Next, operations of the nut according to the present Embodiment 4 will be described by way of an example of a fastening structure for fixing a welding member fixing jig of a resistance welder.

First, a reference example of a fastening structure for fixing a welding member fixing jig of a resistance welder will be described with reference to FIG. 9(A) and FIG. 9 (B).

As illustrated in FIG. 9(A), when welding using a resistance welder, the welding member fixing jig 601 is used to fix a welding member that is omitted from illustration. This welding member fixing jig 601 is fixed to the substrate 602 by the bolt 501 and a nut 504. When welding is performed in this state, electric current flows between the welding member fixing jig 601 and the nut 504, or between substrate 602 and the welding member fixing jig 601, which may become welded due to Joule heat. When the welding member fixing jig 601 and the nut 504 become welded, the nut 504 cannot be detached, and the welding member can no longer be detached.

Accordingly, it is conceivable to interpose the resin insulator 603 such as Bakelite or the like between the substrate 602 and the welding member fixing jig 601, as illustrated in FIG. 9(B), and further assemble the flanged collar 604 that has insulating properties, and that is made of Bakelite or the like, between the welding member fixing jig 601 and the bolt 501 and the nut 504 as well, and perform welding with insulation thus performed. The flanged collar 604 is for insulating between nut 504 and the welding member fixing jig 601, and further between the shaft portion 502 of the bolt 501 and the welding member fixing jig 601.

However, assembling such a flanged collar 604 that has insulating properties leads to an additional part of the flanged collar 604, and also increased size of the welding member fixing jig 601 and the resin insulator 603 due to this addition, increasing costs. This also leads to poorer work efficiency when detaching the welding member fixing jig 601, as well.

FIG. 9(C) is a configuration example of temporary fastening using the nut 401 with the insulation function adding member according to Embodiment 4.

That is to say, the resin insulator 603 such as Bakelite is interposed between the welding member fixing jig 601 serving as the fastened member and the substrate 602, in the same way as in FIG. 9(B), thereby insulating between the welding member fixing jig 601 and the substrate 602.

The shaft portion 502 of the bolt 501 is then passed, from the substrate 602 side, through a hole 602*b* in the substrate 602, the hole 603*a* in the insulator 603, and further the hole 601*a* in the welding member fixing jig (fastened member) 601, and the nut 401 is fastened to the shaft portion 502 protruding therefrom.

Between the welding member fixing jig 601 and the nut 401 is insulated by the insulation function adding member 420. Accordingly, the flanged collar 604 such as described in the reference example becomes unnecessary, so reduction in costs can be realized, and also conservation of space and improved work efficiency of removing the welding member fixing jig 601 can be realized.

At the time of tightening the nut 401 in Embodiment 4, first, the insulating portion 421 is seated on the welding member fixing jig 601. At this time, the flange side face 417 is not seated. As tightening processes, the frictional force of the insulating portion 421 in contact with the welding member fixing jig 601 increases, and the interface at the contact portion between the sliding portion 422 and the annular protruding portion 416 where frictional force is relatively small slides. Accordingly, excessing twisting does not occur in the insulating portion 421 making up the insulation function adding member 420, and peeling and so forth of the insulating portion 421 can be prevented.

Fastening is completed in a non-contact state in which the flange side face 417 of the flange portion 414 is not seated on the welding member fixing jig 601, and the nut 401 and the welding member fixing jig 601 are maintained in an insulated state.

Axial force at the time of fastening is dependent on compression reactive force of the insulating portion 421 of the insulation function adding member 420 and the sliding portion 422, and fastening is performed with a relatively weak force for the tightening force. The insulating portion 421 and the sliding portion 422 are formed of resin or a rubber-like elastic material, which exhibits deterioration at an early stage, but the nut 401 is for temporary attachment, and is removed after welding, so deterioration is not problematic.

Also, the contact surface pressure at the contact portion between the sliding portion 422 and the annular protruding portion 416, i.e., the contact surface pressure at the interface of the seat-face-side side face 416b of the annular protruding portion 416 and the second-side-face covering portion 422b of the sliding portion 422 increases so as to be in close contact without space therebetween, and fluids such as water, air, or the like can be sealed off.

Note that in the above Embodiment 4, description has been made by way of an example of a hexagonal nut with a flange, but the present disclosure is not limited to a hexagonal nut, and is applicable to a square nut, a cap nut, a wingnut, or the like. The point is that application can be broadly made to various types of female screw members that have a female screw member main body serving as a fastener main body having a seat face, a screw hole in which a female screw is formed to tighten the seat face of the female screw member main body as to a fastened member, and a flange portion that is provided on the female screw member main body, with a seal function adding member that is annular in shape being mounted to the flange portion.

Other Configuration Examples of Insulation Function Adding Members

Also, the insulation function adding members 320 and 420 in the above Embodiments 3 and 4 are integrally formed on the annular protruding portions 316 and 416 of the flange portions 314 and 414, but the insulation function adding members 320 and 420 may be formed separately from the bolt 301 and the nut 401, so as to be detachably assembled to the bolt 301 and the nut 401.

FIG. 10(A) illustrates an example of detachably assembling the insulation function adding member 320 to the flange portion 314 of the bolt 301, and FIG. 10(B) illustrates an example of detachably assembling the insulation function adding member 420 to the flange portion 414 of the nut 401. The configurations of the insulation function adding members 320 and 420 are the same as those in Embodiments 3 and 4, and component portions that are the same are denoted by the same signs.

According to this arrangement, in a case of the service life having elapsed, or the insulation function adding members 320 and 420 being damaged, resources can be conserved by replacing the insulation function adding members 320 and 420 alone.

Also, the fitting shapes of the annular protruding portions 316 and 416 and the recessed portions 318 and 418 of the sliding portions 322 and 422 that fit with each other, in Embodiments 3 and 4, are not limited to the cross-sectional shapes described above, and the sliding portions 322 and 422 are rotatably slidable in the circumferential direction as long as the cross-sectional shapes taken along a plane passing through the center axial lines N3 and N4 are the same shape at any position in the circumferential direction. For example, the head-portion main-body-side side face 316a (tubular-body-side side face 416a) and the shaft-portion-side side face 316b (seat-face-side side face 416b) of the annular protruding portions 316 and 416 with which the first-side-face covering portions 322a and 422a and the second-side-face covering portions 322b and 422b come into contact do not have to be parallel to a plane orthogonal to the center axial lines N3 and N4. Also, these may be inclined faces inclined by a predetermined angle as to the plane orthogonal to the center axial lines N3 and N4, may be curved faces, and may be uneven.

FIG. 16 illustrates a modification of an annular protruding portion.

Figure 16A:
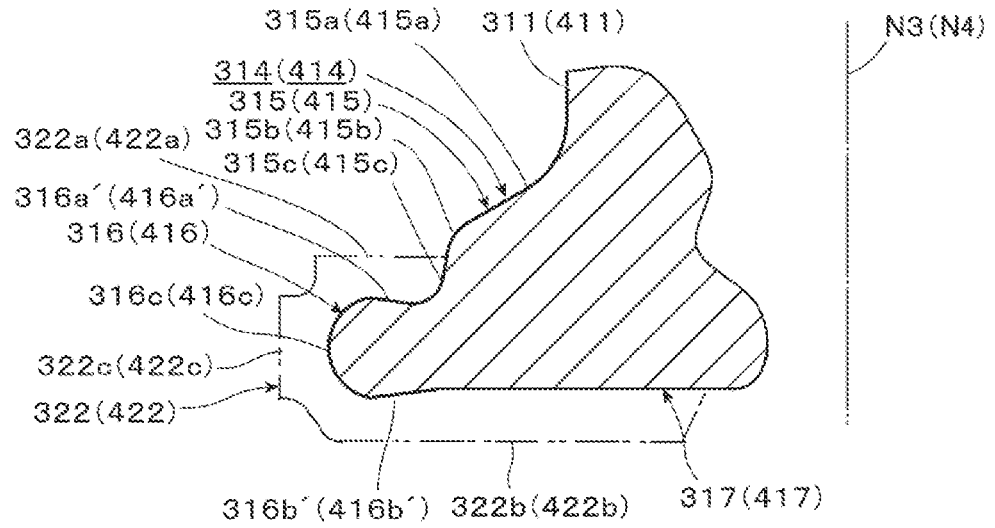
FIG. 16(A) and FIG. 16(B) are partial cross-sectional views illustrating modifications of annular protruding portions according to Embodiments 3 and 4.

In FIG. 16(A), the annular protruding portions 316 and 416 have cross-sectional letter-C shapes. That is to say, a head-portion main-body-side side face 316a' (tubular-body-side side face 416a') of the annular protruding portions 316 and 416, with which the first-side-face covering portions 322a and 422a of the sliding portions 322 and 422 come into contact are tapered shapes inclining toward the screw end side, from the outer diameter side toward the inner diameter side. Also, a shaft-portion-side side face 316b' (seat-face-side side face 416b') with which the second-side-face covering portions 322b and 422b of the sliding portions 322 and 422 come into contact are tapered shapes inclining toward an opposite direction from the screw end side, from the outer diameter side toward the inner diameter side. The contact faces of the first-side-face covering portions 322a and 422a and the second-side-face covering portions 322b and 422b of the sliding portions 322 and 422 are also tapered shapes, in accordance with the head-portion main-body-side side face 316a' (tubular-body-side side face 416a') and the shaft-portion-side side face 316b' (seat-face-side side face 416b') of the annular protruding portions 316 and 416.

Figure 16B:
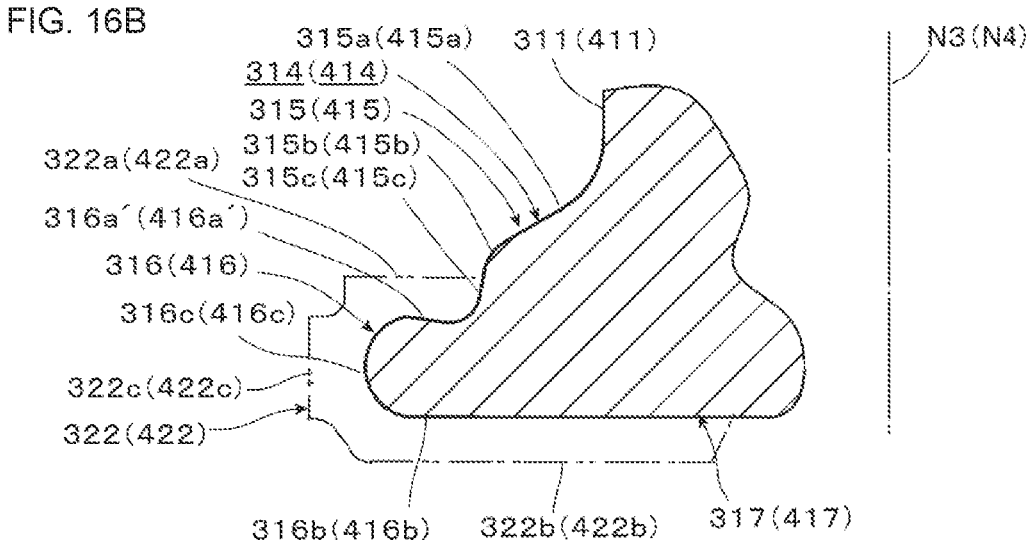

In FIG. 16(B), the head-portion main-body-side side face 316a' (tubular-body-side side face 416a') of the annular protruding portions 316 and 416 are tapered shapes inclining toward the screw end side, from the outer diameter side toward the inner diameter side, and the shaft-portion-side side face 316b (seat-face-side side face 416b) are flat faces that are orthogonal to the center axial lines N3 and N4.

Note that these modifications are exemplary, and not limited to these modifications. For example, the cross-sectional shapes of the outer circumferential faces of the annular protruding portions 316 and 416 and the cross-sectional shapes of the outer circumference covering portions 322c and 422c of the sliding portions 322 and 422 are not limited to cross-sectional arc shapes, and may be recessed arcs, polygons such as triangles, squares, or the like, recessed and protruding shapes, and so forth, as long as the cross-sectional shapes taken along a plane passing through the center axial lines N3 and N4 are the same shape at any position in the circumferential direction.

Also, although sliding is performed at the interfaces of the annular protruding portions 316 and 416 of the flange portions 314 and 414 and the sliding portions 322 and 422 in the above Embodiments 3 and 4, a configuration may be made in which the insulating portions 321 and 421 slide at the interfaces of the sliding portions 322 and 422 and the insulating portions 321 and 421. For example, forming the insulating portions 321 and 421 to have cross-sectional letter-C shapes, and to cover the first-side-face covering portions 322a and 422a of the sliding portions 322 and 422, enables sliding to be performed at the interfaces of the sliding portions 322 and 422 and the insulating portions 321 and 421, without falling out. Further, an arrangement in which sliding is performed on at least one of the interfaces of the sliding portions 322 and 422 and the insulating portions 321 and 421, and the interfaces of the sliding portions 322 and 422 and the flange portions 314 and 414 enables sliding to be performed on at least one of the interfaces, and twisting deformation of the insulating portions 321 and 421 and the sliding portions 322 and 422 can be minimized.

Further, in the above Embodiments, the insulation function adding members 320 and 420 have a two-layer configuration of the insulating portions 321 and 421 and the sliding portions 322 and 422, but a three-layer structure may be made in which an adhesive layer is added between the insulating portions 321 and 421 and the sliding portions 322 and 422, and further, a sliding portion may be further disposed between the insulating portions 321 and 421 and the sliding portions 322 and 422 such that a plurality of layers of sliding portions are disposed, and various types of structures can be applied without departing from the spirit of the present disclosure.

FIG. 17 is a partial cross-sectional view illustrating various types of modifications of the insulation function adding members according to Embodiments 3 and 4.

Figures 17A, 17B, 17C:
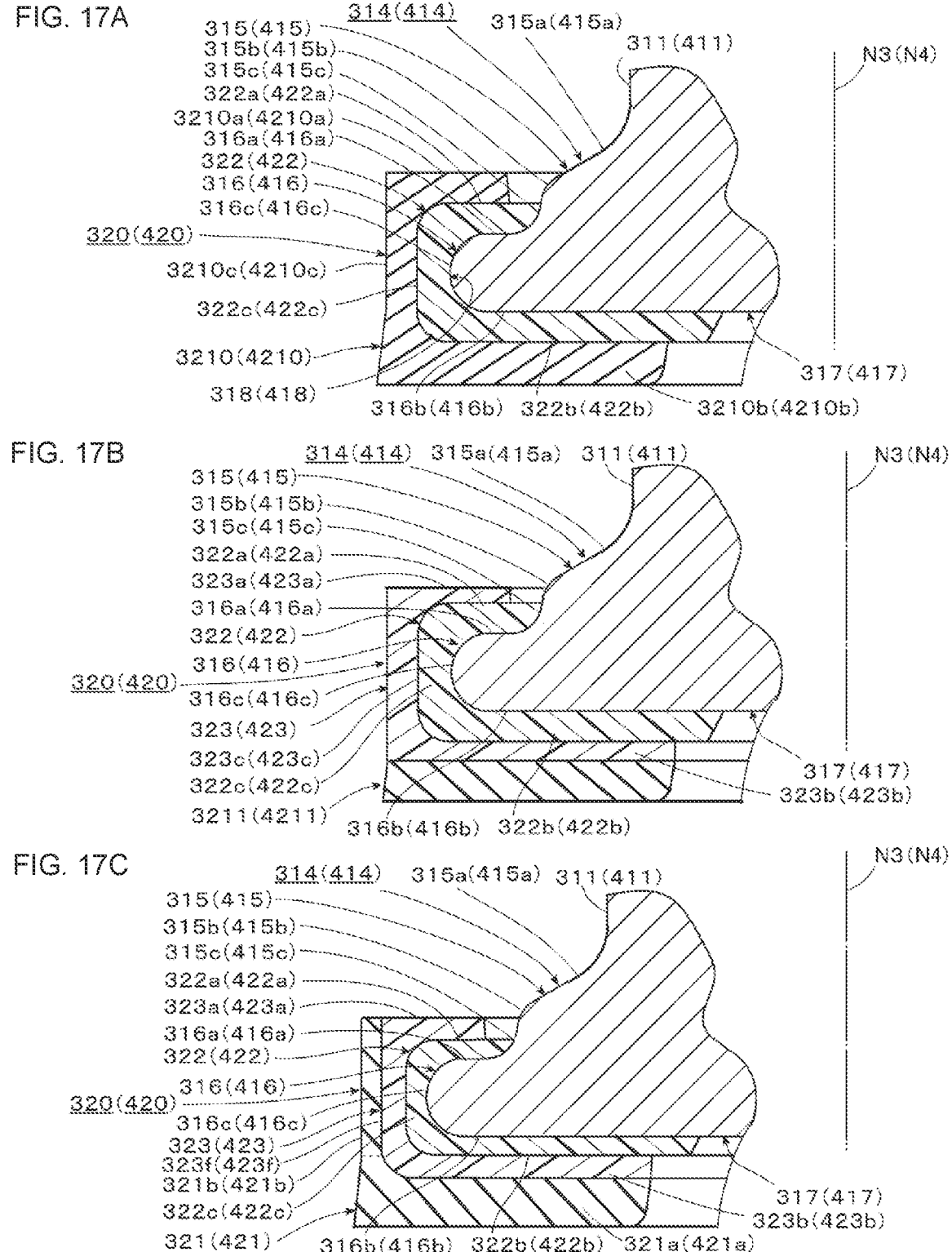
FIG. 17(A) to FIG. 17(C) are partial cross-sectional views illustrating various types of modifications of the insulation function adding members according to Embodiments 3 and 4.

FIG. 17(A) illustrates a modification in which the insulating portion has a cross-sectional letter-C shape.

That is to say, insulating portions 3210 and 4210 have outer circumferential engaging portions 3210*c* and 4210*c* that cover the outer circumference covering portions 322*c* and 422*c* of the sliding portions 322 and 422, first-side-face engaging portions 3210*a* and 4210*a* that cover the first-side-face covering portions 322*a* and 422*a* of the sliding portions 322 and 422, and second-side-face engaging portions 3210*b* and 4210*b* that cover the second-side-face covering portions 322*b* and 422*b* of the sliding portions 322 and 422.

The cross-sectional shapes of the insulating portions 3210 and 4210, the sliding portions 322 and 422, and the annular protruding portions 316 and 416, that fit to each other, taken along a plane passing through the center axial lines N3 and N4, are the same shapes regardless of the phase in the circumferential direction where the cross-section is taken, and are capable of relative rotational sliding in the circumferential direction.

For example, making the outer circumferential shape of the annular protruding portions 316 and 416 to be non-circular, rotation of the sliding portions 322 and 422 is restricted, and sliding can be performed at the interfaces of the sliding portions 322 and 422 and the insulating portions 3210 and 4210. In any case, both of the interfaces of the annular protruding portions 316 and 416 and the sliding portions 322 and 422, and the interfaces of the sliding portions 322 and 422 and the insulating portions 3210 and 4210, may be rotationally slidable. The point is that it is sufficient for sliding to be capable on at least one interface of the interfaces of the annular protruding portions 316 and 416 and the sliding portions 322 and 422, and the interfaces of the sliding portions 322 and 422 and the insulating portions 3210 and 4210.

Corner portions of the outer circumference covering portions 322*c* and 422*c* of the sliding portions 322 and 422 and the first-side-face covering portions, and corner portions of the outer circumference covering portions 322*c* and 422*c* and the second-side-face covering portions may be curved face shapes, or may be chamfered.

FIG. 17(B) illustrates an example in which insulating portions 3211 and 4211 are rotationally slidably fit as to the sliding portions 322 and 422 via the intermediate sliding portions 323 and 423, with the sliding portions 322 and 422 and the intermediate sliding portions 323 and 423 formed by two-shot molding, such that the insulating portions 3211 and 4211 are adhered and fixed to the intermediate sliding portions 323 and 423.

The intermediate sliding portions 323 and 423 have cross-sectional letter-C shapes and include outer circumferential engaging portions 323*c* and 423*c* that cover the outer circumference covering portions 322*c* and 422*c* of the sliding portions 322 and 422, first-side-face engaging portions 323*a* and 423*a* that cover the first-side-face covering portions 322*a* and 422*a* of the sliding portions 322 and 422, and second-side-face engaging portions 423*b* and 423*b* that cover the second-side-face covering portions 322*b* and 422*b* of the sliding portions 322 and 422.

FIG. 17(C) is an example in which the insulating portions 321 and 421 are rotationally slidably fit as to the sliding portions 322 and 422 via the intermediate sliding portions 323 and 423, in the same way as in FIG. 17(B), but the sliding portions 322 and 422, the intermediate sliding portions 323 and 423, and the insulating portions 321 and 421, are formed by three-shot molding.

The sliding portions are the interfaces of the intermediate sliding portions 323 and 423 and the sliding portions 322 and 422, or the interfaces of the sliding portions 322 and 422 and the annular protruding portions 316 and 416, while the interfaces of the insulating portions 321 and 421 and the intermediate sliding portions 323 and 423 are fixed and do not slide.

The insulating portions 321 and 421 include the insulating portion main bodies 321*a* and 421*a* that are annular and that are joined to the second-side-face engaging portions 323*b* and 423*b* of the intermediate sliding portions 323 and 423, and engaging portions 321*b* and 421*b* that extend from the insulating portion main bodies 321*a* and 421*a* to the outer circumferential covering portions 322*c* and 422*c* sides, and engage grooves 323*f* and 423*f* formed on the outer circumferences of the outer circumferential covering portions 322*c* and 422*c*.

Note that in Embodiment 3 and Embodiment 4 described above, the insulating portions 321 and 421 come into contact with the fastened member 200 consecutively in the circumferential direction, over the entire circumference thereof, and also have the sealing function, but the insulation function alone is sufficient.

A configuration may be made in which the contact faces of the insulating portions 321 and 421 are provided non-consecutively and intermittently in the circumferential direction, if only for the insulation function.

FIG. 10(C) is a plan view illustrating an example of an insulation portion in which the contact face is non-continuous in the circumferential direction, and FIG. 10(D) in the same figure is a circumferential-direction cross-sectional view of the contact face along line D-D in FIG. 10(C) in the same figure.

That is to say, a plurality of recessed portions 321*d* and 421*d* are provided to a contact face 421*e* of the insulating portions 321 and 421 in the circumferential direction, and the contact face 421*e* is non-continuous in the circumferential direction. Accordingly, the outer side region and the inner side region of the insulating portions 321 and 421 communicate through the recessed portions 321*d* and 421*d*.

Thus, the bolt 301 is electrically insulated by the insulating portion 321 with respect to the head portion 310 and the attached member, but there is no sealing function. Also, the nut 401 is insulated by the insulating portion 421 with respect to the nut main body 410 and the fastened member 200, but there is no sealing function.

The screwing fastener according to the present disclosure is broadly applicable for preventing infiltration of water, such as in fixing portions and the like of body frames of automobiles, for example. This also is broadly applicable to preventing leakage of gasses, such as attaching portions and the like of covers that separate organic solvent gas and environments in which sparks are generated, for example.

REFERENCE SIGNS LIST

1 Bolt (screwing fastener)
10 Head portion (fastener main body)
11 Head portion main body
13 Shaft portion
13a Male thread (screw portion)
14 Flange portion
15 Flange main body
15a First inclined face
15b Corner portion
15c Step wall
16 Annular protruding portion
16a Head-portion main-body-side side face
16b Shaft-portion-side side face
16c Outer circumferential face
17 Seat face
17a Second inclined face
18 Recessed portion
20 Seal function adding member (function adding member)
21 Seal portion
21a Seal main body
21b Engaging portion
21c First rib
21d Second rib
21e Base portion
22 Sliding portion
22a First-side-face covering portion
22b Second-side-face covering portion
22c Outer circumference covering portion
22d First notch
22e Second notch
22f Groove
N Center axial line
101 Nut (screwing fastener)
110 Nut main body (fastener main body)
111 Tubular body
113 Screw hole
113a Female thread (screw portion)
114 Flange portion
115 Flange main body
115a First inclined face
115b Corner portion
115c Step wall
116 Annular protruding portion
116a Tubular-body-side side face
116b Seat-face-side side face
116c Outer circumferential face
117 Seat face
117a Second inclined face
118 Recessed portion
120 Seal function adding member (function adding member)
121 Seal portion
121a Seal main body
121b Engaging portion

121c First rib
121d Second rib
121e Base portion
122 Sliding portion
122a First-side-face covering portion
122b Second-side-face covering portion
122c Outer circumference covering portion
122d First notch
122e Second notch
122f Groove
200 Fastened member
200a Hole
201 Fixing member
201a Hole
202 Bolt
202a Head portion
202b Shaft portion
204 Nut
204a Weld portion
N1 Center axial line
301 Bolt (screwing fastener)
310 Head portion (fastener main body)
311 Head portion main body
313 Shaft portion
313a Male thread (screw portion)
314 Flange portion
315 Flange main body
315a First inclined face
315b Corner portion
15c Step wall
315d Shaft-portion-side side face
316 Annular protruding portion
316a Head-portion main-body-side side
316b Shaft-portion-side side face
316c Outer circumferential face
317 Flange side face
318 Recessed portion
320 Insulation function adding member
321 Insulating portion
321a Insulating portion main body
321b Engaging portion
321d Recessed portion
322 Sliding portion
322a First-side-face covering portion
322b Second-side-face covering portion
322c Outer circumference covering portion
322d First notch
322e Second notch
322f Groove
501 Bolt
502 Shaft portion
503 Bolt head portion
504 Nut
601 Welding member fixing jig
601a Hole
602 Substrate
602a Hole
603 Insulator
603a Hole
604 Flanged collar
N3 Center axial line
401 Nut (screwing fastener)
410 Nut main body(fastener main body)
411 Tubular body
413 Screw hole
413a Female thread (screw portion)
414 Flange portion

415 Flange main body
415*a* First inclined face
415*b* Corner portion
415*c* Step wall
415*d* Seat-face-side side face
416 Annular protruding portion
416*a* Tubular-body-side side face
416*b* Seat-face-side side face
416*c* Outer circumferential face
417 Seat face
418 Recessed portion
420 Insulation function adding member (function adding member)
421 Insulating portion
421*a* Insulating portion main body
421*b* Engaging portion
421*d* Recessed portion
421*e* Contact face
422 Sliding portion
422*a* First-side-face covering portion
422*b* Second-side-face covering portion
422*c* Outer circumference covering portion
422*d* First notch
422*e* Second notch
422*f* Groove
604 Bolt
604*a* Head portion
604*b* Shaft portion
N4 Center axial line

The invention claimed is:

1. A screwing fastener, comprising:
a fastener main body having a seat face;
a screw portion for tightening the fastener main body to a fastened member;
a flange portion provided to the fastener main body, the flange portion is provided with a flange main body and an annular protruding portion that protrudes outward from an outer circumference of the flange main body; and
a function adding member that is mounted to the flange portion, the screwing fastener configured to be tight-ened with the function adding member configured to be compressed between the flange portion and the fastened member,
wherein the function adding member has at least a two-layer structure of a first adding portion that includes a recessed portion configured to be fit with the annular protruding portion and having slidability, and a second adding portion that is configured to come into contact with the fastened member,
wherein the first adding portion is rotationally slidably in contact with the flange portion.

2. The screwing fastener according to claim 1, wherein the second adding portion is a seal portion that is configured to have a seal function and that is configured to be in close contact with the fastened member and sealing off fluid.

3. The screwing fastener according to claim 2, wherein the function adding member protrudes from the seat face of the fastener main body.

4. The screwing fastener according to claim 1, wherein at least one of the first adding portion and the second adding portion is an insulator that has an insulating function.

5. The screwing fastener according to claim 1, wherein the function adding member is detachably attachable to the flange portion.

6. A function adding member of a screwing fastener, the function adding member configured to be attached to a flange portion of the screwing fastener, the flange portion is provided with a flange main body and an annular protruding portion that protrudes outward from an outer circumference of the flange main body, the function adding member comprising:
at least a two-layer structure of a first adding portion that includes a recessed portion configured to be fit with the annular protruding portion and having slidability, and a second adding portion that is configured to come into contact with a fastened member, wherein the first adding portion is rotationally slidably in contact with the flange portion.

* * * * *